United States Patent [19]

Tomisawa

[11] 4,249,447

[45] Feb. 10, 1981

[54] TONE PRODUCTION METHOD FOR AN ELECTRONIC MUSICAL INSTRUMENT

[75] Inventor: Norio Tomisawa, Hamamatsu, Japan

[73] Assignee: Nippon Gakki Seizo Kabushiki Kaisha, Hamamatsu, Japan

[21] Appl. No.: 52,587

[22] Filed: Jun. 27, 1979

[30] Foreign Application Priority Data

Jun. 30, 1978 [JP] Japan .................................. 53/79948

Jun. 30, 1978 [JP] Japan .................................. 53/79949

[51] Int. Cl.$^3$ .......................... G10H 1/00; G06F 1/02

[52] U.S. Cl. ...................................... 84/1.01; 84/1.23; 84/1.11; 364/721

[58] Field of Search ...................... 84/1.01, 1.19, 1.25, 84/1.11, 1.22, 1.23; 364/718, 721

[56] References Cited

U.S. PATENT DOCUMENTS 4,175,464 11/1979 Deutsch ............................... 84/1.19

OTHER PUBLICATIONS

IBM Technical Disclosure Bulletin, vol. 20, No. 12, May 1978, p. 5196 ("Tone Generator" by D. Multrier).

*Primary Examiner*—S. J. Witkowski

*Assistant Examiner*—Forester W. Isen

*Attorney, Agent, or Firm*—Spensley, Horn, Jubas & Lubitz

[57] ABSTRACT

A method for producing a tone waveform having a desired spectral construction by modulating an input address signal of a selected frequency for a waveform memory. For the modulation of the input address signal, the output of the waveform memory is multiplied by a parameter $\beta$ of a suitable value and the multiplication product is added to the input address signal. If the input address varies in the manner of, for example, a saw-tooth wave, a desired tone waveform can be produced within a range between a saw-tooth wave and a sinusoidal wave by selecting a suitable value of the parameter $\beta$. More specifically, a saw-tooth wave is produced as a tone wave form if a sufficiently large value of $\beta$ is selected. As $\beta$ is gradually decreased, the amplitude is decreased from a higher order and the amplitude also disappears from a higher order until the tone waveform becomes a sinusoidal wave when $\beta$ is zero. The waveform memory having its input address modulated in the above described manner is used not only for directly producing a desired tone waveform but for modulating an input address of another waveform memory. In the latter case, a tone waveform is produced by the other waveform memory.

6 Claims, 63 Drawing Figures x=200Hz

β = 0.0982

β=0.1963

β=0.3927

β=0.5554

β = 0.7854

β=0.9340

β=1.111

β=1.571 x=200Hz

β=0.0982

β=0.1963

β=0.3927

β=0.5554

β=0.7854

β=0.9340

β=1.111

β=1.571
0dB
-60dB
AMPLITUDE
FREQUENCY
0
10kHz

FIG. 7(a)
FIG. 7(b)
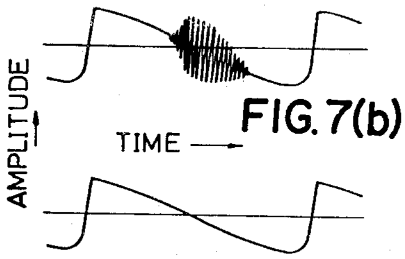
FIG. 8
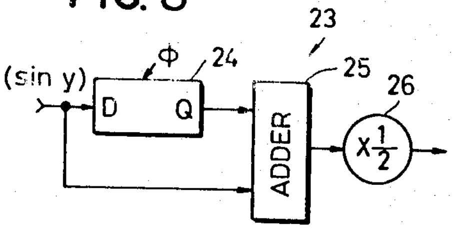
FIG. 9
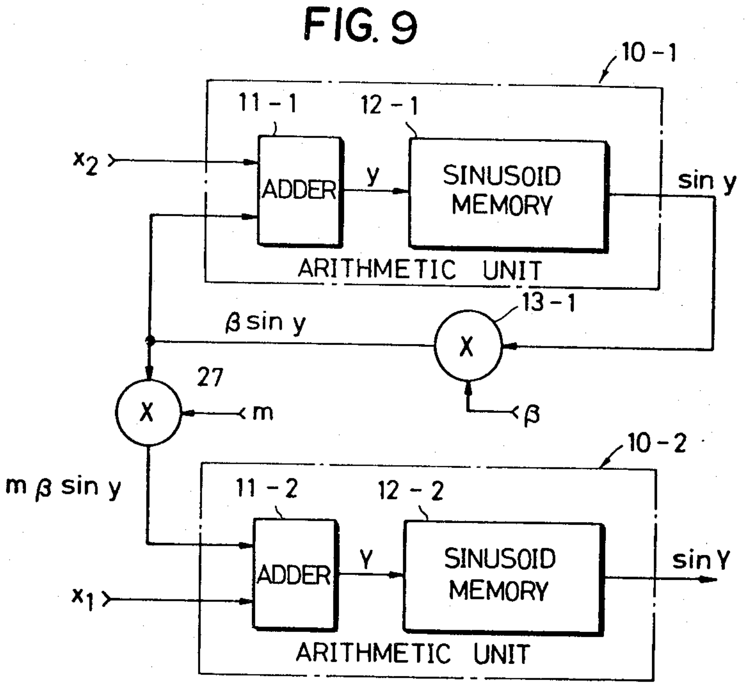
FIG. 10
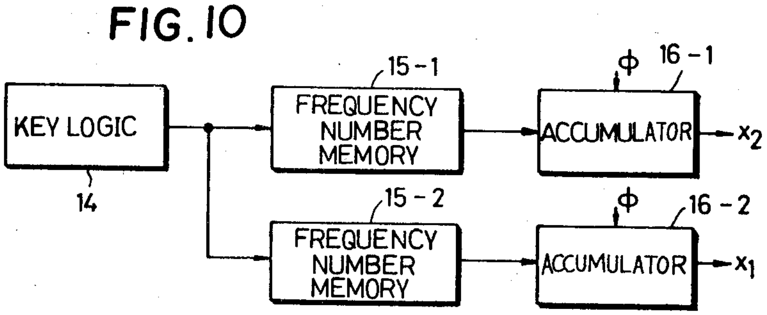

[$x_1 = x_2 = 200$Hz, $m = 2$]
$\beta = 0.0982$ FIG. 11(a)
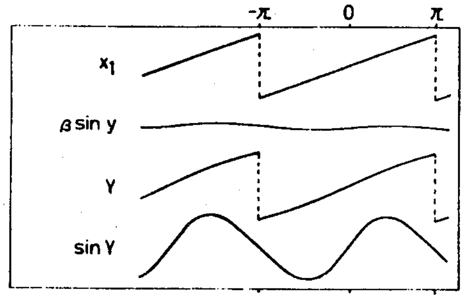
$\beta = 0.7854$ FIG. 11(e)
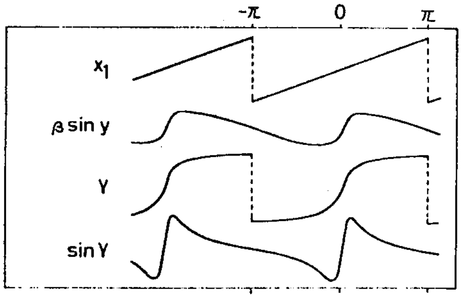
$\beta = 0.1963$ FIG. 11(b)
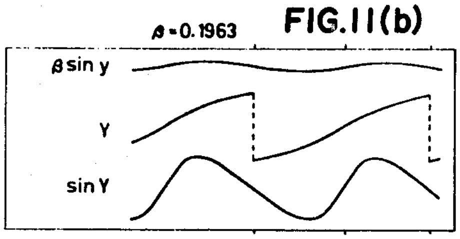
$\beta = 0.9340$ FIG. 11(f)
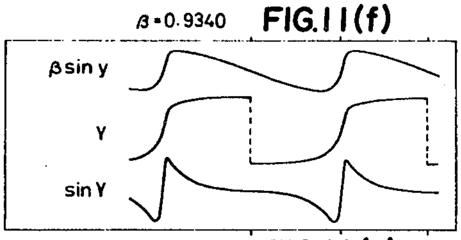
$\beta = 0.3927$ FIG. 11(c)
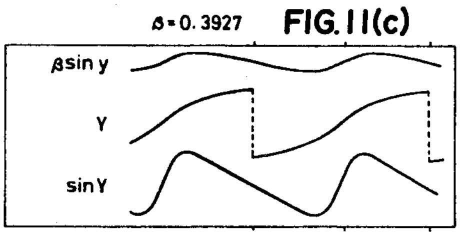
$\beta = 1.111$ FIG. 11(g)
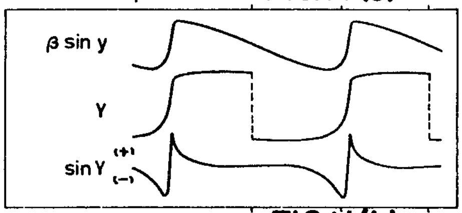
$\beta = 0.5554$ FIG. 11(d)
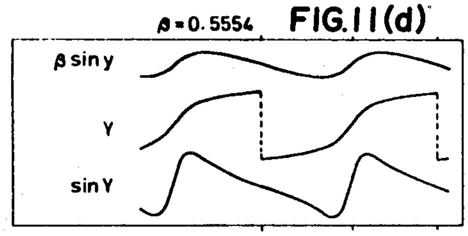
$\beta = 1.571$ FIG. 11(h)
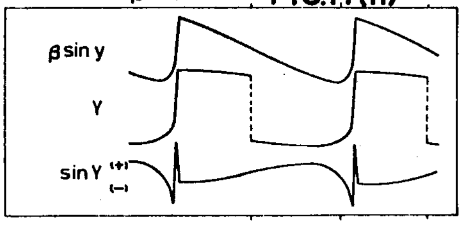

[$x_1 = x_2 = 200$Hz, m=2]

0dB
$\beta$=0.0982
AMPLITUDE
-60dB
0
FREQUENCY
10kHz $\beta$=0.1963

$\beta$=0.3927

$\beta$=0.5554

$\beta$=0.7854

$\beta$=0.9340

$\beta$=1.111

$\beta$=1.571

(b)

$\begin{bmatrix} x_1 = 200\text{Hz} & \\ x_2 = 800\text{Hz} & \beta_1 = \beta_2 = 0.9340 \end{bmatrix}$

TONE PRODUCTION METHOD FOR AN ELECTRONIC MUSICAL INSTRUMENT

BACKGROUND OF THE INVENTION

This invention relates to a tone production method for an electronic musical instrument and, more particularly, to a method capable of continuously varying partial contents, particularly harmonic overtone components i.e. spectral construction of a tone wave and thereby continuously varying the tone color of the produced tone.

Various methods have been proposed to synthesize musical tones in an electronic musical instrument. One of the proposed methods is a technique disclosed in the specification of U.S. Pat. No. 3,809,786 entitled "Computor Organ" According to this method, Fourier components (harmonic ingredients) of a musical tone are individually computed and summed up to synthesize the musical tone. This method is meritorious in that a wide range of musical tones can be synthesized but is disadvantageous in that it requires a large number of computation circuits resulting in bulkiness in construction of the electronic musical instrument. This prior art method is also accompanied by technical difficulties that increase in the number of harmonics used for synthesizing a musical tone requires expansion of a harmonic coefficient memory for storing correspondingly increased number of harmonic coefficients and also requires an increased frequency of a clock used for computation for shortening time for computing the harmonics. If the number of harmonics is to be increased in the prior art method with the frequency of the computation clock being unchanged, a parallel processing system must be introduced and this requires a further enlargement of construction of the electronic musical instrument.

There is also a prior art method for producing a musical tone utilizing a frequency modulation technique as disclosed in the specification of U.S. Pat. No. 4,018,121. This prior art method has overcome the above described disadvantage of the Fourier components synthesizing method fairly effectively for it can produce many partial tones or harmonic or unharmonic components by calculation of a simple mathematic equation. This prior art method is particularly effective for synthesizing percussion instrument sounds (including piano) and wind instrument sounds. The prior art method, however, is disadvantageous in that the amplitudes of respective partial tones become irregular, i.e., irregularity occurs in the spectrum envelope of the musical tone if a large modulation index (I) is used, so that the method is not very suitable for producing a tone having a relatively smooth spectral construction (e.g. string instrument tones).

SUMMARY OF THE INVENTION

It is, therefore, an object of the present invention to provide a tone production method capable of continuously controlling a spectral construction of a tone wave with a simple construction by reading out waveforms which are substantially different from a waveform stored in a memory.

It is another object of the invention to provide a tone production method capable of producing a tone of a spectral construction having a monotonously decreasing tendency according to which the amplitude decreases as the order of overtone increases.

It is another object of the invention to provide a tone production method capable of readily producing desired waveforms such as a saw-tooth waveform, a rectangular waveform and a waveform in which overtones of higher orders are emphasized by simple control of a parameter and also capable of continuously decreasing the number and amplitude of overtones from these waveforms to a sinusoidal waveform and, in a reverse case, continuously increasing the number and amplitude of overtones.

It is another object of the invention to provide a method capable of producing a tone waveform having a desired spectral construction by feeding back a waveform amplitude value read from a waveform memory to the address input side of the memory at a suitable feedback factor and modulating the address reading rates.

It is still another object of the invention or provide a tone production method in which waveform amplitude sample values read from a waveform memory of one tone production system is added at a suitable ratio to an address input of a waveform memory of another tone production system to substantially modulate the rate of addressing the waveform memory of the other tone production system and a tone waveform read by the modulated address is fed back at a suitable feedback ratio to the address input of said one waveform memory.

These and other objects and features of the invention will become apparent from the description made hereinbelow with reference to the accompanying drawings.

BRIEF DESCRIPTION OF THE DRAWINGS

In the accompanying drawings;

FIGS. 7(*a*) and 7(*b*) are graphical diagram respectively showing examples of waveforms in which a hunting has occurred and such hunting has been removed;

FIG. 8 is a block diagram showing an example of an averaging device provided for preventing the hunting phenomenon shown in FIG. 7(*a*);

FIG. 9 is a block diagram showing an organization of another embodiment of the invention;

FIG. 10 is a block diagram showing an example of a device for generating different variables $x_1$ and $x_2$;

FIGS. 11(*a*) through 11(*h*) are graphical diagrams showing waveforms appearing in respective parts in FIG. 9 for various values of $\delta$ and $m=2$, which waveforms have been observed by the test device;

DESCRIPTION OF PREFERRED EMBODIMENTS

Figure 1:
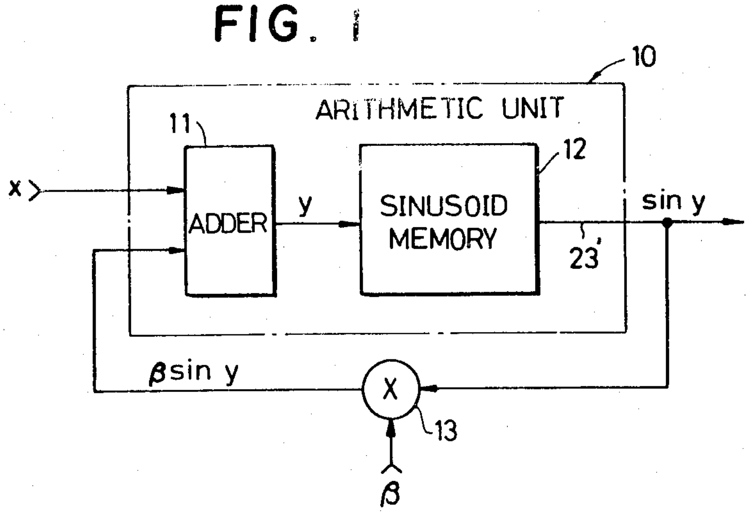
FIG. 1 is a block diagram showing a basic organization of the invention.

Referring first to FIG. 1 showing the basic organization of the invention, an arithmetic unit 10 comprises an adder 11 and a sinusoidal wave memory 12 read by an output y of the adder 11. To one of the inputs of the adder 11 is applied variable x and to the other input is applied an output sin y of the sinusoidal wave memory 12 at a suitable feedback ratio. This feedback ratio is determined by a feedback parameter (factor) $\beta$. More specifically, a multiplier 13 is inserted in the feedback loop for multiplying the output sin y of the memory 12 with the feedback parameter $\beta$. Product $\beta\cdot\sin y$ of the multiplication is applied to the adder 11. The output y of the adder 11 therefore is $x+\beta\cdot\sin y$ which constitutes an actual address input of the sinusoidal wave memory 12. It is assumed that a predetermined delay time exists between application of the input to the adder 11 and delivering of the output from the sinusoidial wave memory 12.

Figure 2:
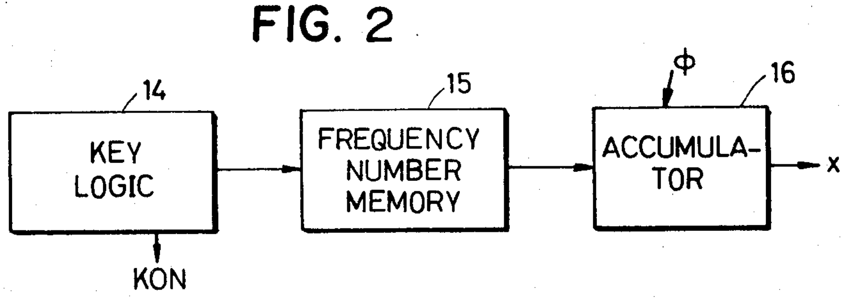
FIG. 2 is a block diagram showing an example of a device for producing a variable x employed in the invention.

The variable x is generated by a device such as one shown in FIG. 2. A signal representing a key depressed in the keyboard is supplied from a key logic 14 to a frequency number memory 15. A frequency number which is a constant corresponding to the frequency of the depressed key, i.e. phase increment, thereupon is read from the frequency number memory 15. The frequency number read from the memory 15 is applied to an accumulator 16 where the frequency number is repeatedly added in accordance with a clock pulse $\phi$. The accumulator 16 consists of a counter of modulo M and its output is supplied to the adder 11 as the variable x. Since $M=2^N$ (N is an integer), the value of the variable x repeats increase from $-2^{N-1}$ corresponding to a phase $-\pi$ to $+2^{N-1}$ corresponding to a phase $+\pi$ at a certain frequency of repetition (hereinafter referred to as "repetition frequency"). Accordingly, the variable x increases quickly if the frequency number is large and increases slowly if the frequency number is small. The variation rate, i.e. the repetition within the moduls frequency of the variable x determines the frequency of a tone produced by the arithmetic unit 10 (FIG. 1).

Figure 3:
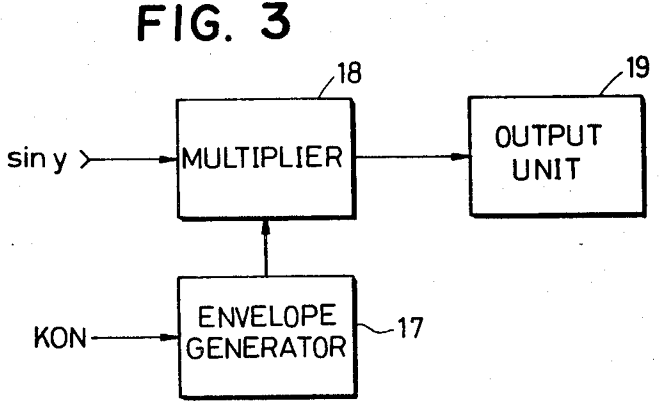
FIG. 3 is a block diagram schematically showing an example of a unit for processing the output tone waveform for sounding it as a musical tone.

The tone waveform sin y provided by the arithmetic unit 10 is processed thrugh a circuitry shown in FIG. 3 for production of a musical tone. An envelope generator 17 generates an envelope shape signal in response to a key-on signal KON provided by the key logic 14 in accordance with depression of the key. This envelope shape signal is supplied to a multiplier 18. The multiplier 18 multiplies the tone waveform sin y provided by the arithmetic unit 10 with the envelope shape signal to inpart an amplitude envelope to the tone waveform sin y. The tone signal outputted from the multiplier 18 is applied to an output unit 19 and thereafter is sounded as a musical tone through known processing such as filtering.

In the organization shown in FIG. 1, partial contents of a tone wave provided by the arithmetic unit 10 can be continuously controlled by changing the value of the feedback parameter $\beta$. The reason therefor is explained below. For the sake of simplicity, it is assumed here that there is no time delay in the feed back loop.

The phase input y of the produced tone waveform sin y which is the output of the adder 11 is expressed by the following equation:

$$y=x+\beta\cdot\sin y \quad (1)$$

As a result of analysis of this equation (1), it has been confirmed that the tone waveform sin y can be expressed by the equation $$\sin y = \sum_{n=1}^{\infty} \frac{2}{n\beta} \cdot Jn(n\beta) \cdot \sin nx \quad (2)$$

This equation (2) can be expanded to the equation $$\sin y = \frac{2}{\beta} \cdot J_1(\beta) \cdot \sin x + \frac{2}{2\beta} \cdot J_2(2\beta) \cdot \sin 2x + \frac{2}{3\beta} \cdot J_3(3\beta) \cdot \sin 3x + \quad (3)$$

In the equation (2), Jn(n) is a Bessel function where n represents the order and $n\beta$ the modulation index. This equation (3) may appear to resemble the equation used in the known frequency modulation system in that it contains Bessel functions but the equation (2) here is remarkably different from the known equation in that the order n is included in the modulation index of this Bessel function $Jn(n\beta)$ and that $(2/n\beta)$ is multiplied as a coefficient to this Bessel function $Jn(n\beta)$.

In the equation (2) or (3), a fundamental wave component is obtained where $n=1$. The value of n corresponds to the order to each partial. Relationship between the order of each partial and its relative amplitude obtained from the equation (2) is listed in the following Table 1:

TABLE 1

| | Order | Relative amplitude |
|---|---|---|
| 1. | (Fundamental) | $\frac{2}{\beta} \cdot J_1(\beta)$ |
| 2. | (2nd harmonic) | $\frac{2}{2\beta} \cdot J_2(2\beta)$ |
| 3. | (3rd harmonic) | $\frac{2}{3\beta} \cdot J_3(3\beta)$ |
| 4. | (4th harmonic) | $\frac{2}{4\beta} \cdot J_4(4\beta)$ |
| . | . | |
| . | . | |
| . | . | |
| n | (n-th harmonic) | $\frac{2}{n\beta} \cdot J_n(n\beta)$ |

Figure 4:
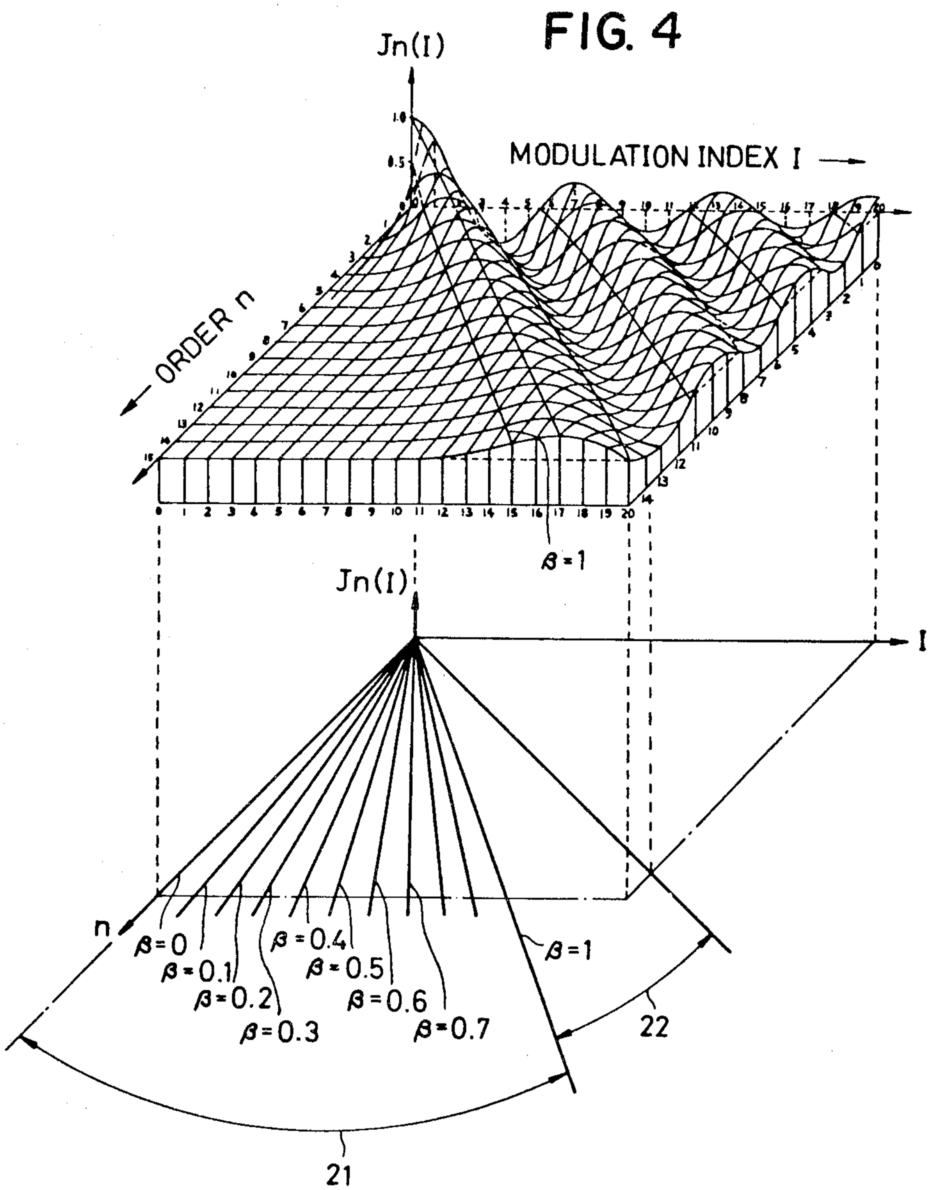
FIG. 4 is a stereogram showing Bessel function and a graphical diagram showing a region of Bessel function utilized in the invention.
Figure 5A:
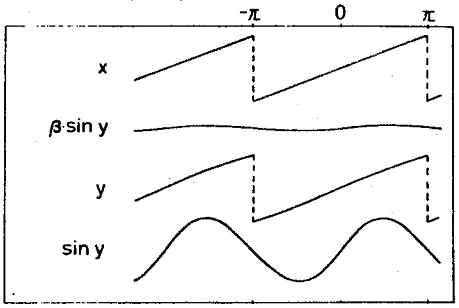
FIGS. 5(*a*) through 5(*h*) are graphical diagrams showing waveforms appearing in respective parts in FIG. 1 for various values of $\beta$, which waveforms have been observed by a device manufactured for trial (hereinafter referred to as a "test device"
Figure 5B:
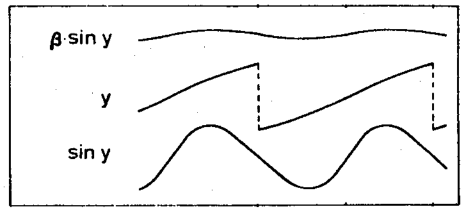
Figure 5C:
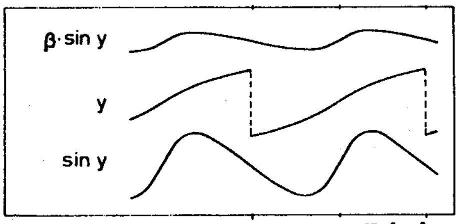
Figure 5D:
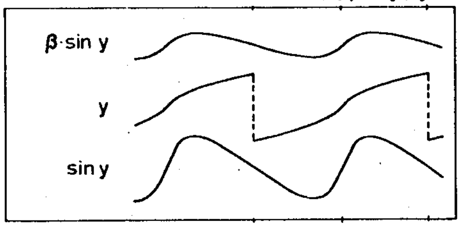
Figure 5E:
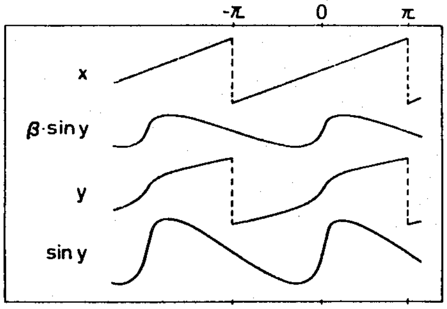
Figure 5F:
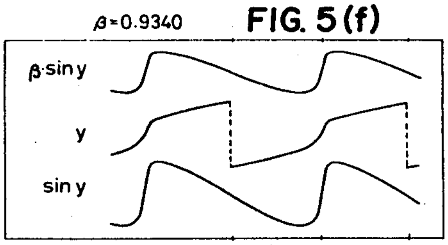
Figure 5G:
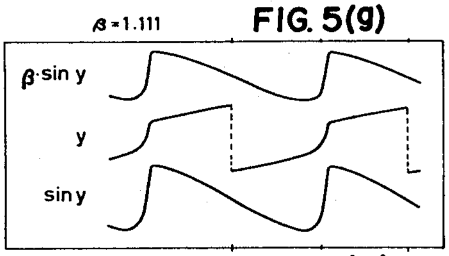
Figure 5H:
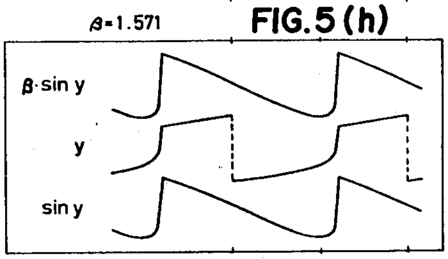

The spectral construction shown in Table 1 is analyzed from a stereographical representation of Bessel function Jn(I) shown in FIG. 4.

In the prior art musical tone synthesizing system utilizing frequency modulation, the modulation index I is common through the component Jn(I) of each order (n=0, 1, 2, . . . ) so that each Bessel function value Jn(I) represented by a height at a position where the common modulation index I crosses each order n determines the spectral construction. Accordingly, as the modulation index I increases, a spectral envelope obtained assumes an undulating configuration with a result that a smooth (i.e., in a manner of monotone function) control of the spectral construction becomes extremely difficult.

According to the present invention, the modulation index $n\beta$ differs for each order n and increases approximately in a manner of monotone increasing in proportion to the order n. Accordingly, a Bessel function value $Jn(n\beta)$ obtained for each order n as $I=n\beta$ in FIG. 4 participates in determining the spectral construction. In FIG. 4, this Bessel function value $Jn(n\beta)$ is designated by a height at a point on a line which passes the origin where n=0 and $\beta=0$ and has an angle determined by $\beta$. This state is shown below the stereographic representation in FIG. 4. The line determining the value $Jn(n\beta)$ rotates about the origin from the axis n toward the axis I as the value $\beta$ increases from zero.

As will be understood from FIG. 4, the spectral envelope represented by $Jn(n\beta)$ tends to vary approximately in a manner of monotone function in a region 21 where $\beta$ is $0=\beta=1$ and in a region 22 where $\beta$ is somewhat larger than 1. More specifically, the amplitude $Jn(n\beta)$ gradually decreases as the order n increases and also gradually decreases as the value $\beta$ decreases, whereby the spectal construction changes generally smoothly. It should be noted that an actual spectral construction according to the present invention is slightly different from the one illustrated in FIG. 4, for Bessel function $Jn(n\beta)$ is multiplied with the coefficient $2/n\beta$. This enhances the tendency that the amplitude decreases as the order n increases.

Further analysis of the amplitude coefficient $(2/n\beta)\cdot J_n(n\beta)$ in the equation (2) reveals that the spectral construction assumes a configuration which resembles the spectral construction of a saw-tooth wave in the vicinity of $\beta=1$. The sessel function $Jn(n\beta)$ obtained form Bessel function table in a case where the value $\beta$ is $\beta=1$ is shown in the following Table 2:

TABLE 2

| n | Jn(nβ) | | β = 1 |
|---|---|---|---|
| 1 | $J_1(1)$ | = | 0.4401 |
| 2 | $J_2(2)$ | = | 0.3528 |
| 3 | $J_3(3)$ | = | 0.3091 |
| 4 | $J_4(4)$ | = | 0.2811 |
| 5 | $J_5(5)$ | = | 0.2611 |
| 6 | $J_6(6)$ | = | 0.2458 |
| 7 | $J_7(7)$ | = | 0.2336 |
| . | . | | . |
| . | . | | . |
| . | . | | . |

As will be apparent from Table 2, Bessel function $Jn(n\beta)$ when $\beta=1$ assumes approximately uniform values regardless of the magnitude of the order n. Approximate values of the amplitude coefficient $2/n\beta$ $Jn(n\beta)$ computed on the basis of Table 2 are shown in the following Table 3:

TABLE 3

| n | Approximate value of $\frac{2}{n\beta} \cdot Jn(n\beta)$ | β = 1 |
|---|---|---|
| 1 | 1 | |
| 2 | ½ | |
| 3 | ⅓ | |
| 4 | ¼ | |
| 5 | $\frac{1}{5}$ | |
| 6 | $\frac{1}{6}$ | |
| . | . | |
| . | . | |
| . | . | |

Since $Jn(n\beta)$ is approximately uniform regardless of the order n, it can be assumed that $(2/\beta)\cdot Jn(n\beta)$ is constant regardless of variation in the order n. The amplitude coefficient therefore is substantially determined by the remaining coefficient portion 1/n. The distribution as shown in Table 3 corresponds to the spectral distribution of a saw-tooth wave.

Although Table 3 is an only approximate representation of the amplitude coefficient, it will now be understood that a tone waveform having a spectral construction which resembles that of a saw-tooth wave can be produced by the system shown in FIG. 1.

The Bessel function $Jn(n\beta)$ using the order n has a tendency to resembling monotone increasing in a region where $\beta$ assumes a value from 0 to approximately 1. Accordingly, in a region where $\beta$ is approximately 1, the value of $Jn(n\beta)$ assumes a substantially uniform value as in the case where $\beta$ is $\beta=1$ and a spectral distribution resembling a saw-tooth wave is obtained. As $\beta$ approaches 0 from 1, the Bessel function value $Jn(n\beta)$ for each order n gradually decreases and, in addition, the greater the order n is, the steeper becomes the inclination of decrease in $Jn(n\beta)$. This tendency can be readily confirmed by the Bessel function table. By way of example, values of $Jn(n\beta)$ obtained from the Bessel function table in cases $\beta$ is 0.1 and 0.5 are listed in the following Table 4.

TABLE 4

| | β | | |
|---|---|---|---|
| n | 0.1 | 0.5 | Jn(nβ) |
| 1 | 0.0499 | 0.2423 | |
| 2 | 0.0050 | 0.1149 | |
| 3 | 0.0006 | 0.0610 | |
| 4 | 0.0001 | 0.0340 | |
| 5 | 0.0000 | 0.0196 | |
| 6 | 0.0000 | 0.0114 | |

TABLE 4-continued

| n | β 0.1 | β 0.5 | Jn(nβ) |
|---|---|---|---|
| 7 | 0.0000 | 0.0067 | |
| | . | . | |
| | . | . | |

It will be noted from the above table that the value of Jn(nβ) decreases to about ½ as the order n increases by 1 when β is 0.5 and decreases to about 1/10 as the order n increases by 1 when β is 0.1.

Accordingly, as β gradually decreases from about 1 to 0, the amplitude of the harmonic components decreases and besides the harmonic components extinguish one by one from one of a higher order.

Thus, the amplitude of harmonic components of a tone waveform can be controlled smoothly by varying the value of the feedback parameter β within a certain range (from 0 to a number which is slightly greater than 1, e.g. 1.5). In the case of the organization shown in FIG. 1, if the value of β is large (about 1), a saw-tooth waveform is produced and, as β is decreased, the amplitude is decreased from a higher order and extinguishes one by one from one of a higher order. A tone waveform produced when β is 0 is a sinusoidal wave.

If β is 0, the feedback factor is 0 so that a sinusoidal wave shich is the same as the one stored in the memory 12 is provided as a tone waveform. This will be confirmed by an analysis mode by using the above equation (2) according to which the amplitude coefficient of the fundamental wave is $$\lim_{\beta \to 0} \frac{2}{\beta} J_1(\beta) = 1$$

whereas the amplitude coefficient of the remaining components is $$\lim_{\beta \to 0} \frac{2J_n(n\beta)}{n\beta} = 0.$$

Figures 6A, 6B, 6C, 6D, 6E, 6F, 6G, 6H:
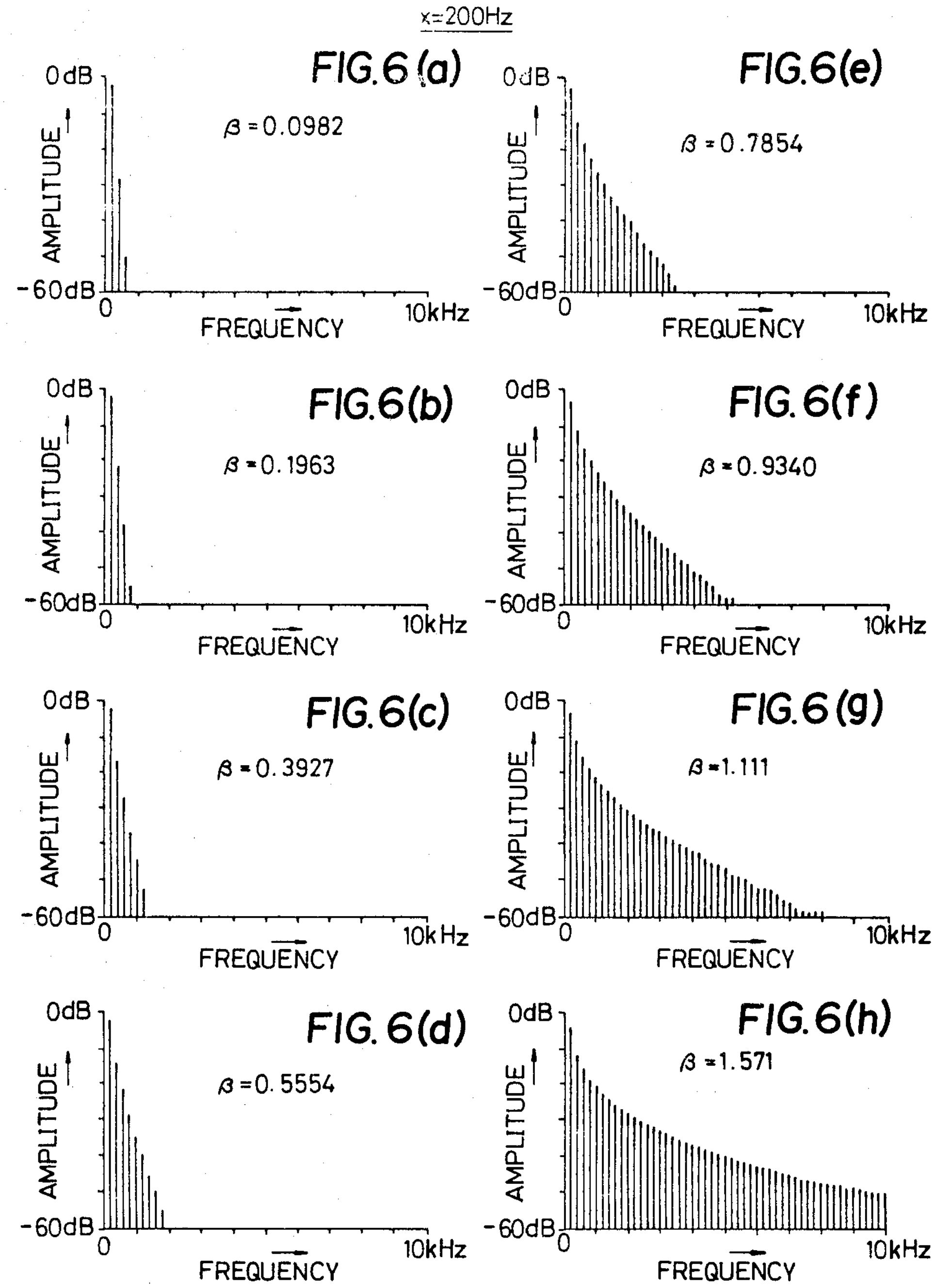
FIGS. 6(*a*) through 6(*h*) are graphical diagrams showing results of observing spectral construction of the respective tone waveforms sin y shown in FIGS. 5(*a*) through 5(*h*)

The above described phenomenon has been confirmed by the test device FIGS. 5(*a*) through 6(*h*) show waveforms in the respective parts of FIG. 1 obtained by the test device, FIGS. 6(*a*) through (*b*) are diagram showing the spectral construction of the produced tone. These diagrams show data observed in eitht cases where the feedback parameter β ranges from 0.00982 to 1.571. In FIG. 5(*a*), the waveform at the top is an observed waveform of the variable x, the second waveform is an observed waveform of the feedback amount β·sin y outputted from the multiplier 13, the third waveform is an observed waveform of the output y of the adder 11 and the waveform at the bottom in an observed waveform of the output sin y of the sinusoidal wave memory 12 read out by the output y. The spectral distribution shown in FIGS. 6(*a*) through 6(*h*) represent harmonic components of the musical tone waveform sin y of the memory 12. The frequency at which the variable x is repeated (within the modulo) is 200 Hz. Since the waveform of the variable x does not change i in response to change in the value of β, the waveform of the variable x is shown only in FIGS. 5(*a*) and 5(*e*) and is omitted in the rest of figures.

From FIGS. 5(*a*)-5(*h*) and FIGS. 6(*a*)-6(*h*) it has been confirmed that by changing the value of the feedback parameter β the number and the amplitude of harmonic components of the tone waveform to be produced can be controlled continuously and smoothly with the configuration of the harmonics being continuously changed from a sinusoidal wave to a saw-tooth wave.

Referring now to FIGS. 5(*a*)-5(*b*), production of the tone according to the organization shown in FIG. 1 will be analized.

If the feedback parameter β is a small value in the vicinity of 0, the feedback waveform β·sin y obtained through the multiplier 13 changes only slightly about 0. Accordingly, the variable x is modulated only slightly in the adder 11 so that the output y of the adder 11 resembles the variable x in configuration. As a result, a waveform resembling the sinusoidal waveform stored in the memory 12 is produced by the arithmetic unit 10 as the output musical tone waveform sin y. THis will be observed from the waveform diagram with β=0.0982.

As the value of the feedback parameter β increases, the oscillation in positive and negative directions of the feedback waveform β·sin y becomes remarkable. This state will be observed, for example, from the waveform diagram with β=0.3927. A negative amplitude of the feedback waveform β·sin y is subtracted from a portion from −πto 0 of the variable x while a positive amplitude of the feedback waveform β·sin y is added to a portion from 0 to π of the variable x. Accordingly, when the amplitude of the feedback waveform β·sin y changes from a negative region to a positive region, the waveform of the output y of the adder 11 increases steeply in a region where the variable x is in the vicinity of 0. In this region where the waveform y steeply increases, a reading rate of the sinusoidal wave memory 12 increases and the slope of the amplitude of the read out sinusoidal waveform in a portion where the amplitude rises from the negative region to the positive region becomes steep. In the remaining portion the inclination of the waveform y is gradual and the inclination of a corresponding part of the amplitude read from the sinusoidal wave memory 12 is also gradual. Accordingly, the waveform sin y read from the sinusoidal waveform memory 12 becomes apparently different from a normal sinusoidal wave.

As the value of the feedback parameter β further increases, the waveform read from the memory 12 which is steep in the portion where the amplitude rises from the negative region to the positive region is fed back at a high ratio so that the deviation of the output waveform y of the adder 11 increases further. Accordingly, the inclination of the tone waveform sin y read from the memory 12 in correspondence to the waveform y becomes steeper in the portion where the amplitude rises from the negative region to the positive region whereas the waveform sin y becomes more gradual in a portion where the amplitude falls from the positive region to the negative region. Thus, the tone waveform sin y approaches a saw-tooth wave.

Experiments conducted by the inventor has revealed that if data of 10 bits is used and the feedback parameter is increased to more than about 1, hunting as shown in FIG. 7(*a*) occurs in the tone waveform sin y outputted by the memory 12. This hunting occurs in the vicinity of a point at which the value of the output data y of the adder 11 becomes the phase π (or −π). The hunting is considered to be caused by an error in the digital computation. Observing the hunting phenomenon closely, it has been found that amplitude data of both positive and negative signs is alternated rapidly at each output sample point of the memory 12. For preventing occurrence of this hunting phenomenon, an averaging device as shown in FIG. 8 is provided.

The averaging device 23 includes a delay flip-flop 24 driven by a clock pulse $\phi$ which determines the interval of sample points of a tone waveform, an adder 25 which adds the input and output of the flip-flop 24 together and a multiplier 26 which multiplies the output of the adder 25 by $\frac{1}{2}$. This averaging device 23 is inserted at a suitable location in the loop shown in FIG. 1 consisting of the adder 11, the memory 12 and the multiplier 13. A data preceding the data of the present sample point by one sample point, which is the output of the delay flip-flop 24, is added to the data of the present sample point by the adder 25 and the result of addition is multiplied with $\frac{1}{2}$ by the multiplier 26 thereby to provide an average value of data at two sample points adjacent to each other. The averaging device 23 is most advantageously inserted on the output side of the sinusoidal wave memory 12 (i.e. in line 23' in FIG. 1). By virture of this averaging device 23, the amplitude which has oscillated in the positive or negative direction alternatively at each sample point is averaged and the hunting is thereby eliminated. The observed waveforms shown in FIGS. 5(*a*) through 5(*h*) have been obtained by an apparatus including the averaging device 23.

The experiments have also revealed that notwithstanding increases in the repetition frequency of to variable x (i.e. increase in the frequency of the tone waveform to be produced by the arithmetic unit 10) the time interval of a portion where the slope of the produced saw-tooth wave is steep is substantially constant. This is attributed to the time delay provided in the arithmetic unit 10. The time delay in the arithmetic unit 10 which is generally constant regardless of the frequency of a tone to be produced can be neglected in low frequencies for the progress of the variable x is slow, so that a desired steep rise of a saw-tooth wave can be obtained. On the other hand, as the frequency becomes higher, the progress of the variable x becomes faster and the time delay in the arithmetic unit can no longer be neglected with a resulting delay in the feedback. Accordingly, the steepness of the rise portion of the saw-tooth wave is mitigated, i.e. the time interval of the rise portion of the saw-tooth wave is not shortened in proportion to he period of the saw-tooth wave but is maintained substantially constant regardless of the frequency. This is convenient from the standpoint of eliminating noise occurring in relation to the sampling frequency, for increases in the frequency of the tone to be produced causes limitation in frequencies of harmonics of higher orders with a resulting reduction in steepness of the produced waveform.

In the foregoing description, the memory 12 of the arithmetic unit 10 has been described as a sinusoidal wave memory storing a sine wave. The memory 12, however, is not limited to this but a memory storing a cosine wave or a sine function having an initial phase may be employed as feffectively as the above described sinusoidal wave memory. A waveform stored in the memory 12 is not limited to one period waveform but a waveform of a half period or a quarter period may be used by employing a well known technique according to which one period waveform can be produced by controlling reading out of such half or quarter period waveform.

Referring to FIG. 9, another embodiment of the invention will now be described. Arithmetic units 10-1 and 10-2 shown in FIG. 9 are of the same construction as the arithmetic unit 10 shown in FIG. 1, having adders 11-1 and 11-2 and sinusoidal wave memories 12-1 and 12-2. The output sin y of the first arithmetic unit 10-1 is multiplied with the feedback parameter $\beta$ by a multiplier 13-1 and the product $\beta\cdot\sin y$ is fed back to the input side of the arithmetic unit 10-1 just in the embodiment shown in FIG. 1. Accordingly, the operation of the first arithmetic unit 10-1 including the multiplier 13-1 in the feedback loop is entirely the same as the corresponding circuitry in FIG. 1.

The feedback waveform $\beta$, sin y provided by the multiplier 13-1 is also supplied to a multiplier 27 where it is multiplied with a modulation parameter m. The waveform signal m $\beta\cdot\sin y$ outputted by the multiplier 27 is applied to the adder 11-2 of the second arithmetic unit 10-2 where it is added to a variable $x_1$. In response to the output Y ($=x_1+m\ \beta$19 sin y) of the adder 11-2, waveform apmolitudes at respective sample points are read from the sinusoidal wave memory 12-2 to form the output tone waveform sin.Y.

The variable $x_2$ supplied to the first arithmetic unit 10-1 and the variable $x_1$ supplied to the second arithmetic unit 10-2 are phase inputs repeated at desired frequencies. The varialbe $x_1$ may be of the same value as or different from the variable $x_2$. If the same value is used for the variable $x_1$ and $x_2$, the variable x provided by the accumulator 16 shown in FIG. 2 may be supplied commonly to the arithmetic units 10-1 and 10-2 (i.e., $x_1=x_2=x$). If the value of the variable $x_1$ is to be different from that of the variable $x_2$, the variable $x_1$ and the variable $x_2$ are generated through different channels as shown in FIG. 10. A first frequency number memory 15-1 and a secnd frequency number memory 15-2 store different frequency numbers for the same key and these different frequency number are read from the memories 15-1 and 15-2 in response to data provided by a key logic 14 in accordance with depression of a key. These frequency numbers are respectively accumulated in accumulators 16-1 and 16-2 whereby the variables $x_2$ and $x_1$ which are different from each other are produced. The variable $x_2$ outputted by the accumulator 16-1 is supplied to the first arithmetic unit 10-1 and the variable $x_2$ outputted by the accumulator 16-2 to the arithmetic unit 10-2.

In the embodiment shown in FIG. 9, frequency modulation is effected by the second arithmetic unit 10-2 and the m-multiplier 27. More specifically, the frequency modulation is effected by a modulation index determined by the value of the modulation parameter m with the feedback waveform $\beta\cdot\sin y$ obtained from the feedback loop of the first arithmetic unit 10-1 being used as a modulating wave and the repetition frequency of the variable $x_1$ being used as a carrier frequency. By this arrangement, the spectral construction of the tone waveform sin Y provided by the second arithemtic unit 10-2 can be controlled by the feedback parameter $\beta$ and the modulation parameter m so that a range of control can be expanded.

The tone waveform sin Y obtained by the second arithmetic unit 10-2 under the condition of $x_1=x_2=x$ will now be analized.

The output Y of the adder 11-2 of the second arithmetic unit 10-2 is expressed by the equation $$Y=x+m\ \beta\cdot\sin\cdot Y. \qquad (14)$$

where sin Y represents the output of the first arithmetic unit 10-1. It has been found that the tone waveform sin Y obtained as a result of analysis of the equation (4) can be expressed by the following equation:

$$\sin Y = \sum_{n=1} An \sin nx \qquad (5)$$

where $$An = m\left[\frac{1}{n+1-m}\cdot J_{n+1}\{(n+1-m)^{\beta}\} + \frac{1}{n-1+m}\cdot J_{n-1}\{(n-1+m)\beta\}\right]$$

This equation (5) is supposed to provide a spectral construction having the same tendency as that of the equation (2), for the equation (5) includes the order n in the modulation index of Bessel function and also in the denominator of the coefficient in the same manner as in the equation (2). More specifically, if the feedback parameter $\beta$ is set within a certain range (from 0 to a number whih is somewhat greater than 1), the spectral construction of a produced otone waveform (sin Y) has a monotonously decreasing tendency according to which the amplitude level decreases as the order n increases and the amplitude of harmonics of the tone can be continuously controlled by changing $\beta$ within the set ragne. Accordingly, tones of string instruments (i.e. tones of a saw-tooth waveform) can be readily produced and a continuous control of a waveform from a sinusoidal wave to a saw-tooth wave can be effected by the embodiment shown in FIG. 9.

If the variables $x_1$ and $x_2$ are set at $x_1=x_2$ and the modulation parameter m is set at m=1, the organization of FIG. 9 becomes the same as the one shown in FIG. 1. Accordingly, waveforms observed in respective parts in FIG. 9 and spectral distributions thereof under conditions of $x_1=x_2=x=200$ Hz and m=1 are the same as those shown in FIGS. 5 and 6.

If the value of the modulation parameter is too small, the circuit will not be sufficiently useful. If, for instance, the modulation parameter m is zero, the sinusoidal wave mmemory 12-2 of the second arithmetic unit 10-2 is accessed by the variable $x_1$ ($Y=x_1$) and the output tone sin Y is a sinusoidal wave. Experiments made by means of the test device show that interesting results are obtained in a case where the modulation parameter m is within a range of 0.5 to 2.

Figures 12A, 12B, 12C, 12D, 12E, 12F, 12G, 12H:
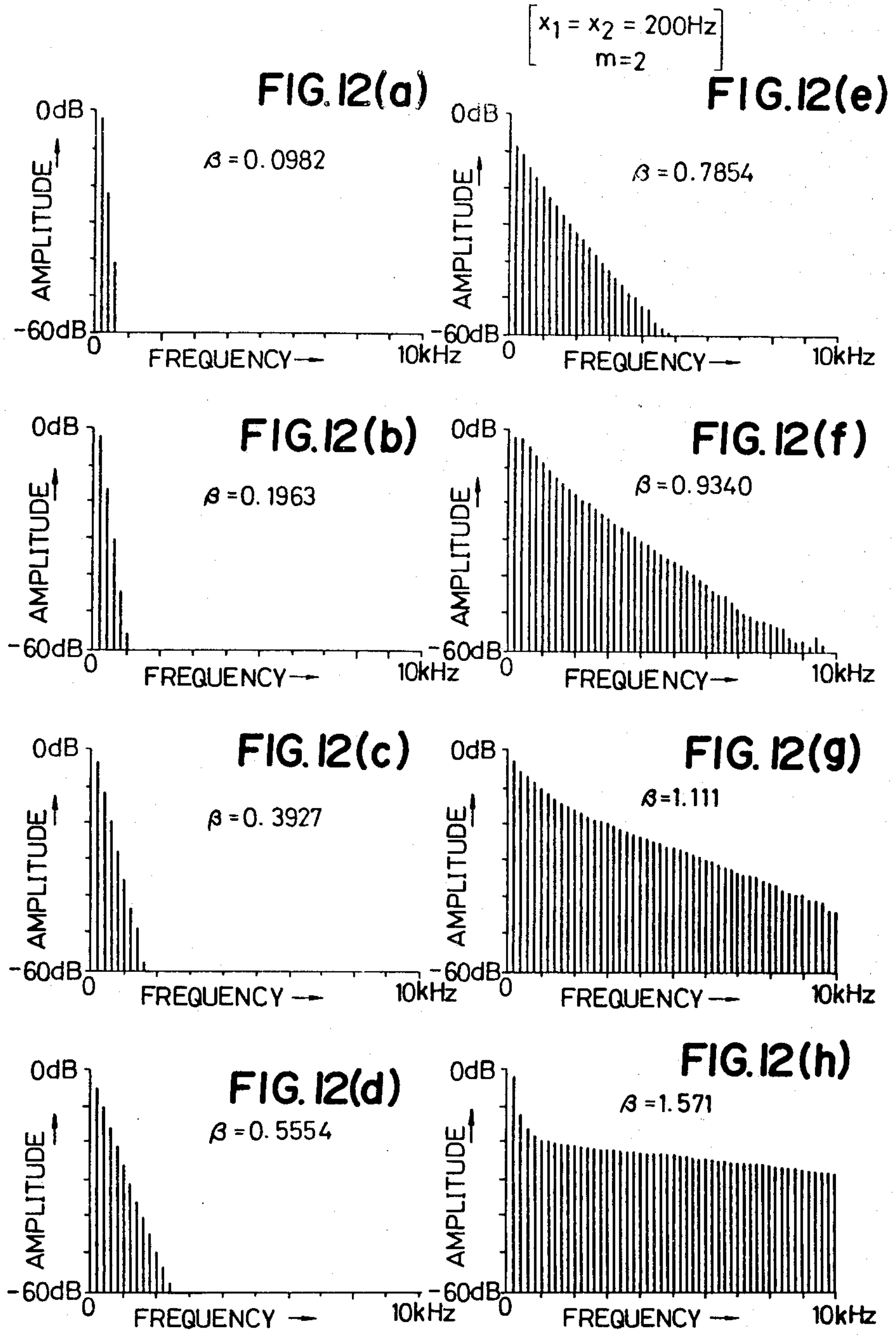
FIGS. 12(*a*) through 12(*h*) are graphical diagrams showing results of observing a spectral constructions of the respective musical tone waveforms sin Y shown in FIGS. 11(*a*) through 11(*h*)
Figure 13A:
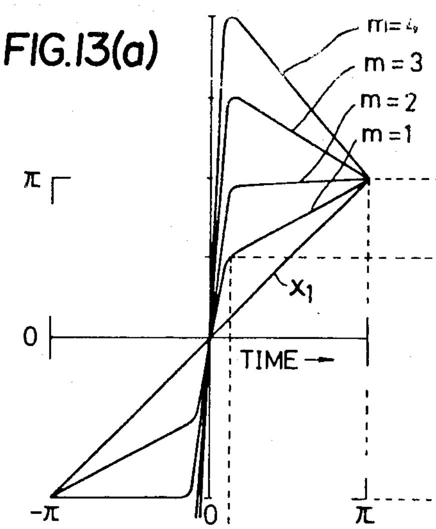
FIGS. 13(*a*) through 13(*d*) are graphical diagrams for diagrammatically analizing the fact that the output tone waveform of the device shown in FIG. 9 assumes a differentiated waveform in which harmonic components of higher orders are emphasized in a case where a large value of the modulation parameter m is used.
Figure 13B:
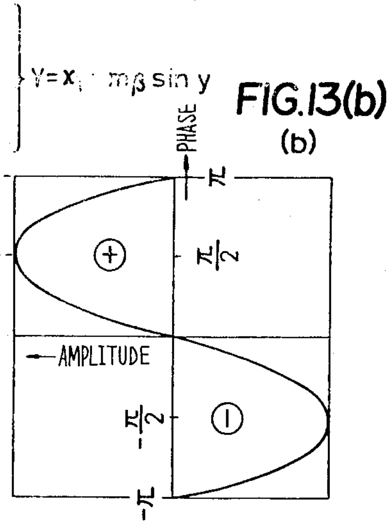
Figure 13C:
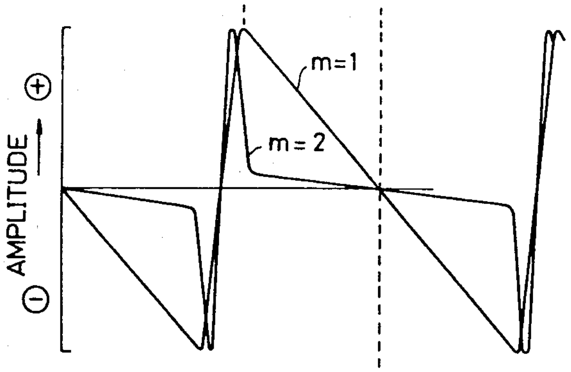
Figure 13D:
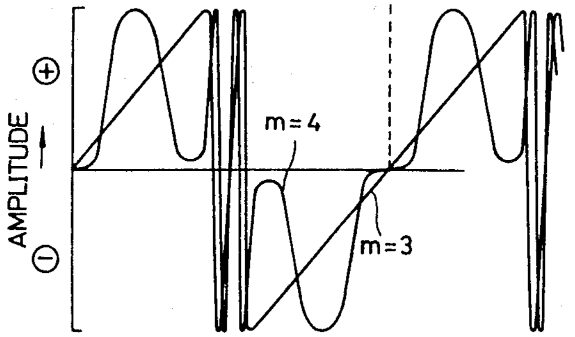
Figure 14A:
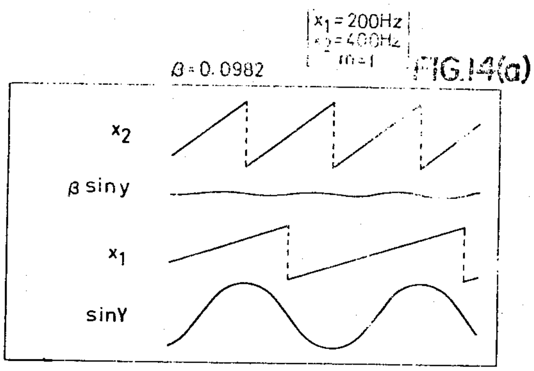
FIGS. 14(*a*) through (*e*) are graphical diagrams showing waveforms appearing in respective parts in FIG. 9 for various values of $\beta$ under conditions of variation rate of $x_1$: variation rate of $x_2=1:2$ and $m=1$, which waveforms have been observed by the test device.
Figure 15A:
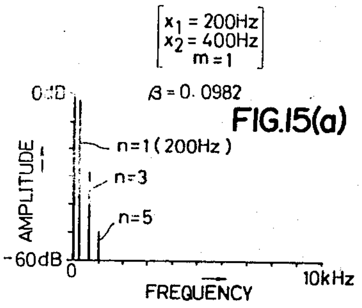
FIGS. 15(*a*) through 15(*e*) are graphical diagram showing results of observing spectral construction of the respective tone waveforms sin Y shown in FIGS. 14(*a*) through 14(*e*)
Figure 14B:
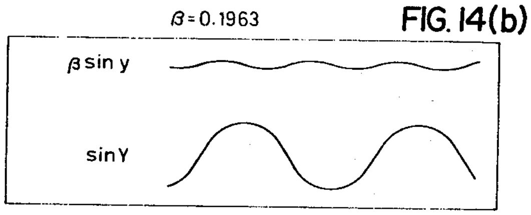
Figure 15B:
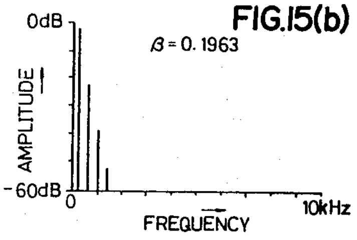
Figure 14C:
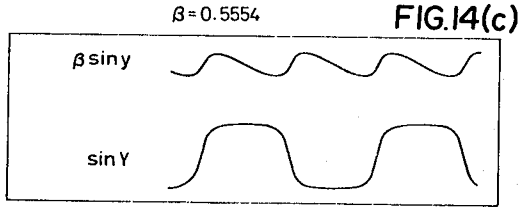
Figure 15C:
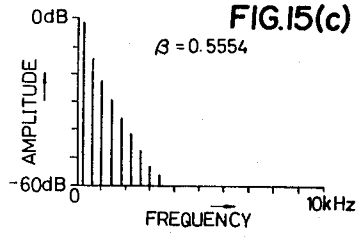
Figure 14D:
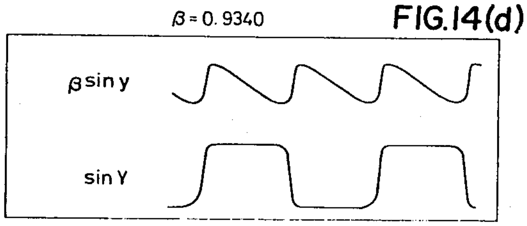
Figure 15D:
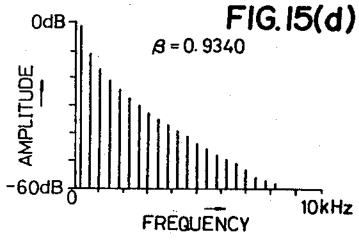
Figure 14E:
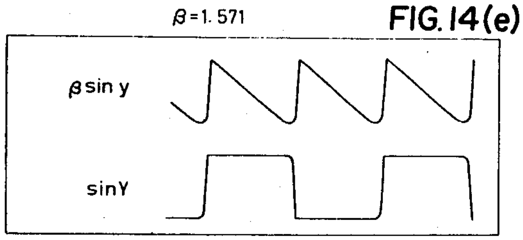
Figure 15E:
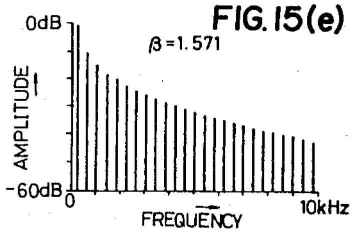

FIGS. 2 11(*a*) through 11(*b*) and FIGS. 12(*a*) through 12(*h*) show waveforms observed in respective parts in FIG. 9 and spectral distributions thereof obtained by the test device under conditions of $x_1=x_2=200$ Hz and m=2. In these figures, either data are shown with the feedback parameter $\beta$ ranging from 0.0982 to B 1.571. At the top of FIG. 1(*a*) is shown a waveform of the variable $x_1$ ($=x_2$) inputted to the second arithmetic unit 10-2. In the second stage is shown the feedback waveform $\beta$ sin y outputted. from the multiplier 13-1 provided in the feedback loop of the first arithmetic unit 10-1. In the third stage is shown the output Y ($Y=x_1+m\,\beta\sin y$) of the adder 11-2 of the second arithmetic unit 10-2. At the bottom is shown the tone waveform sin Y outputted by the second arithmetic unit 10-2. Since the waveform of the variable $x_1$ does not change irrespective of change in $\beta$, the waveform of $x_1$ is shown only in FIGS. 11(*a*) and 11(*e*) and omitted in the rest of figures.

As will be apparent from FIG. 12, a spectral construction of the same type as the one produced by the device shown in FIG. 1 can be produced by the device shown in FIG. 9 and the spectral distribution can be continuously controlled by varying $\beta$ within a range from 0 to about 1.5.

Comparison of FIGS. 11 and 12 with FIGS. 5 and 6 reveals that the former figures have a greater number of harmonics and a higher level of each harmonic than the latter figures.

This phenomenon is analized by the ga graphs of FIGS. 13(*a*) through 3(*d*).

FIG. 13(*a*) shows one cycle of the waveform of the variable $x_1$ and the output Y ($=x_1+m\sin y$) of the adder 11-2 when the modulation parameter m is m=1, 2, 3 and 4, these waveforms being superposed one upon another. The waveform of the output Y differs depending upon the value of $\beta$ and $\beta$ is set at an appropriate value in FIGS. 13(*a*) through 13(*d*). FIG. 13(*b*) shows one cycle of the sinusoidal waveform stored in the sinusoidal wave memory 12-2. FIGS. 13(*c*) and 13(*d*) show the tone waveforms sin Y obtained when the modulation parameter m is 1 and 2, and 3 and 4, respectively.

Since the sinusoidal waveform amplitude from 0 to $\pi/2$ is quickly read out and the sinusoidal waveform ampitude from $\pi/2$ to $\pi$ is slowly read out when the modulation parameter is 1, the musical tone waveform sin Y becomes a saw-tooth wave as shwn in FIG. 13(*c*).

When the modulation parameter m is 2, the sinusoidal wave amplitude from 0 to a phase in the vicinity of $\pi$ is quickly read out by the waveform Y of FIG. 13(*a*) and the amplitude from this phase in the vicinity of $\pi$ to $\pi$ is slowly read out. Accordingly, the tone waveform sin Y rises to its peak value at the beginning of the half period, immediately flls to the neighborhood of a 0 level and thereafter falls gradually to 0.

Since the output Y of the adder 11-2 exceeds the phase $\pi$ when the modulation parameter m is 3 and 4, a negative amplitude is read out in a region where it has exceeded the phase $\pi$, i.e., the amplwutde is quickly read out in a region from 0 to $-\pi/2$ through $\pi/2$ and $\pi$ and is slowly read out in a region from $-\pi/2$ to $2/\pi$ (i.e. $-\pi$) when the modulation parameter m is 3. Accordingly, the tone waveform sin Y as shown in FIG. 13(*d*) which rises to a positive peak value at the beginning of the half cycle, immediately falls to a negative peak value and thereafter rises a gradually to 0 is obtained.

When the modulation parameter m is 4, the amplitude of one cycle of a sinusoidal wave from 0 through $\pi/2$, $\pi(-\pi)$ and $-\pi/2$ to 0 is quickly read out and thereafter the amplitude from 0 to $-$ is slowly read out. Accordingly, the tone waveform sin Y which rises to a positive peak value at the beginning of the half cycle, immediately falls to a negative peak value and thereafter falls gradually to 0 is obtained.

From the above analysis, it has been confirmed that a tone waveform sin Y with abundant harmonic components of higher order as if it had passed differentiation circuit or a high-pass filter can be obtained.

As described above, the embodiment shown in FIG. 9 participates in the continuous control of the spectral construction by varying the feedback parameter $\beta$ and achieves emphasizing of amplitudes of harmonics of higher orders by using a large modulaion parameter m. Accordingly, a tone color of the tone waveform can be readily controlled by appropriately adjusting the parameters $\beta$ and m.

If the value of the variable $x_1$ is made different from that of the variable $x_2$ in the organization of FIG. 9, a result which is somewhat different from the above described analysis with respect to harmonic components can be obtained. As described above, the frequency of the waveform sin y produced by the first arithmetic unit 10-2 is the same as the frequency at which the variable $x_1$ is repeatedly supplied to the arithmetic unit 10-1. The frequency of the waveform m ·sin y applied from the multiplier 27 to the second arithmetic unit 10-2 therefore is the same as the frequency at which the variable $x_2$ is repeated. Accordingly, the harmonic components of the tonw waveform sin Y produced by the second arithmetic unit 10-2 are the same as those produced by modulating a frequency corresponding to the variable $x_1$ by a frequency corresponding to the variable $x_2$. When the variables $x_1$ and $x_2$ are $x_1=x_2$ as in the case shown in FIG. 11, harmonics of all order are produced. When the ratio between the frequencies of the respective variables $x_1$ and $x_2$ is 1:n (where n is 2 or an integer greater than 2), all of the harmonics are not produced but harmonics of some orders are excluded. If, for example, a ratio of the frequencies of is $x_1$ and $x_2$ is set to be 1:2, harmonics of odd number orders are not produced so that a spectral construction equivalent to a rectangular wave is produced. FIGS. 14(*a*) through 14(*e*) show the waveform observed by the test device.

FIGS. 14(*a*) through 14(*e*) show waveforms observed by the test device in cases where $\beta$ is varied in five different values from 0.0982 to 1.571 under a condition of $m=1$ and FIGS. 15(*a*) through 15(*e*) show spectral construction of tone waveforms sin Y shown in FIGS. 14(*a*) through 14(*e*). In FIGS. 14(*a*) through 14(*e*), the waveforms of $x_2$ and $x_1$ do not change irrespective of change in $\beta$ so that the waveforms of $x_2$ and $x_1$ are shown in FIG. 14(*a*) only and are omitted in the rest of figures. FIGS. 14(*a*) through 14(*e*) show also the feedback waveform $\beta$ sin y and the output tone waveform sin Y of the arithmetic unit 10-2. It will be seen from the graphs showing the spectral constructions that harmonics of odd number orders are dropped from each spectra graph. The control characteristic by the feedback parameter $\beta$ is the same as in the previously described embodiments (FIGS. 5 and 6 and FIGS. 11 and 12), i.e., the number and amplitude of harmonics gradually increase by varying $\beta$ from 0 to about 1. The spectral distribution characteristic also is the same as the other embodiments (FIGS. 5 and 10), having a monotone tendency that the amplitude decreases as the order of harmonic increases. It will also be observed that a waveform substantially equivalent to a rectangular wave is obtained by setting $\beta$ at 1.571 As will be apparent from FIGS. 14(*a*) through 14(*e*), the output tone waveform sin Y can be variably and continuously controlled from a sinusoidal waveform to a rectangular waveform by appropriately varying the value of $\beta$.

In the case where the relation between the reception frequencies of the variables $x_1$ and $x_2$ is 1:2, the two frequency number memories 15-1 and 15-2 need not be provided as shown in FIG. 10 but a single frequency number memory may be provided as in the case shown in FIG. 2. In this case, the output x of the accumulator 16 is shifted by one bit toward left by a shifting device to produce 2 x and the two values x and 2 x are used as $x_1$ and $x_2$.

The repetition frequency of $x_1$ may be made higher than that of $x_2$ so that a relation between the repetition frequencies $x_1$ and $x_2$ *L is n*:1 (where n is 2 or an integer greater than 2) may be satisfied. An interesting musical tone waveform can be obtained by such arrangement.

If the relation between the repetution frequencies of $x_1$ and $x_2$ is made that of non-integer multiple, the spectral construction or a tone waveform sin Y provided by the arithmetic unit 10-2 is composed of overtones of non-integer multiple so that an unpitched sound is produced. It has been found that if the repetition frequencies of $x_1$ and $x_2$ are made slightly different from each other, beat is generated and a chorus effect is thereby obtained. For this purpose, the circuit shown in FIG. 10 may be employed produce $x_1$ and $x_2$.

For preventing the above described occurrence of hutning, the averaging device 23 shown in FIG. 8 is inserted at an appropriate place such as the input or output side of the multipleier 27 or more preferably, on the output side of the sinusoidal waveform memory 12-2 respectively shown in FIG. 9.

Figure 16:
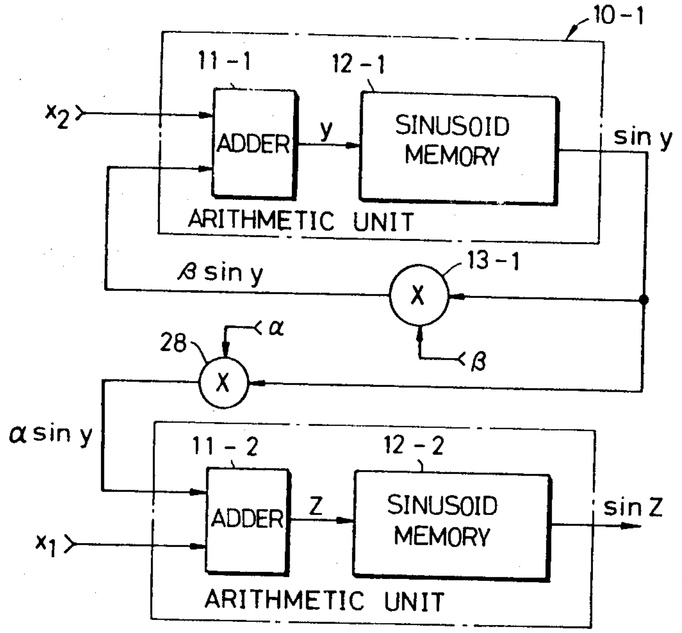
FIG. 16 is a block diagram showing an organization of another embodiment of the invention.

Another embodiment of the invention will now be described with reference to FIG. 16. In the circuit shown in FIG. 16, a couple of arithmetic units 10-1 and 10-2 including adders 11-1 and 11-2 and sinusoidal wave memories 12-1 and 12-2 are provided as in the circuit shown in FIG. 9. The output sin y of the first arithmetic unit 10-1 is fed back to the input side thereof after being multiplied with the feedback parameter $\beta$ in a multiplier 13-1. The circuit of FIG. 16 is different from the circuit of FIG. 9 in that the output sin y of the first arithmetic 10-1 is applied to the input of the second arithmetic unit 10-2 via a multiplier 28. The multiplier 28 receives a modulation parameter $\alpha$ so-that $\alpha$·sin y is applied to the adder 11-2 of the second arithmetic unit 10-2. The adder 11-2 adds the variable $x_1$ and $\alpha$·sin y together to produce $Z=x_1+\alpha\cdot\sin y$. The sinusoidal wave memory 12-2 is accessed by the output Z of the adder 11-2 to produce a tone waveform sin Z. The variables $x_2$ and $x_1$ supplied respectively to the arithmetic units 10-1 and 10-2 are phase inputs similar to those used in the circuit of FIG. 9 and the variables $x_1$ and $x_2$ may be $x_1=x_2$ or $x_1=x_2$.

In the circuit shown in FIG. 16, if the value of the feedback parameter $\beta$ is set to be the same as the modulation parameter $\alpha$, the same condition as in the case where the modulation parameter m is set at 1 in the circuit of FIG. 9 is available. Since $\alpha \sin Y=\beta \sin y$ and hence $z=x_1+\alpha \sin y=x_1+\beta \sin y=Y$, the produced tone waveform is $\sin z=\sin Y$, i.e., the same tone waveform as was produced by the circuit of FIG. 9 is produced. Accordingly, the analysis of the tone waveform made with reference to the embodiment of FIG. 9 applies to analysis of the tone waveform produced by the circuit of FIG. 16.

Assuming conditions of $\beta=\alpha$ and $x_1=x_2$, the organization of FIG. 16 will become the same as that of FIG. 1 for the same reason as was described with respect to the case where conditions $x_1=x_2$ and $m=1$ awas assumed in the embodiment of FIG. 9.

If the modulation parameter $\alpha$ is $\beta=m\beta$, the organization of FIG. 16 will become the same as that of FIG. 9. Accordingly, the same waveforms as are produced by the circuits of FIGS. 1 and 9 can be produced by the circuit of FIG. 16. It should be noted, however, that in the circuit of FIG. 9 the feedback parameter $\beta$ and the modulation parameter m are individually controlled whereas in the circuit of FIG. 16 these parameters are controlled in somewhat different manner.

If $\beta$ and $\alpha$ are varied in association with each other for maintaining a proportional relation $\beta \propto \alpha$, for maintaining, this will be the same control as the parameter control of $\beta \propto m\beta$ in FIG. 9, i.e., the case where $\beta$ is varied while m is fixed in FIG. 9. Accordingly, the waveforms and the spectral distributions shown in FIGS. 5, 6, 11, 12, 14 and 15 can be used as waveforms and spectral distributions appearing in respective parts of FIG. 16. More specifically, if $\beta$ is varied in association with $\alpha$ under conditions of $x_1=x_2$ and $\beta=\alpha$ in FIG. 16, waveforms which are the same as those observed in FIGS. 5 and 6 can be observed and, accordingly, the output tone waveform sin Z can be controlled smoothly from a sinusoidal wave to a saw-tooth wave.

If $\beta$ is varied in association with $\alpha$ maintaining the relation $\beta \propto \alpha$ under conditions of $x_1=x_2$ and $\alpha=2\beta$ waveforms which are the same as those observed in FIGS. 11 and 12 can be observed. If $\beta$ is varied in association with $\alpha$ under condition that the frequencies of $x_1$ and $x_2$ are of the ratio of 1:2 and $\beta=\alpha$, waveforms which are the same as those observed in FIGS. 14 and 15 can be observed.

According to the circuit shown in FIG. 16, harmonic components of the tone waveform sin Z can be controlled in a manner different from the controls effected in the circuits of FIGS. 1 and 9 by controlling the feedback parameter $\beta$ and the modulation parameter $\alpha$ independently from each other.

Further, if the feedback parameter $\beta$ is set at 0 and the feedback loop in the first arithmetic unit 10-1 thereby is interrupted, the output wave form of the arithmetic unit 10-1 becomes sin y = sin $x_2$, i.e. a sinusoidal wave. Consequently, the tone waveform sin z provided by the second arithmetic unit 10-2 becomes a waveform obtained by frequency modulating a sinusoidal wave corresponding to the repetition frequency of the variable $x_1$ by a sinusoidal wave corresponding to the repetition frequency of the variable $x_2$ at a modulation degree $\alpha$.

As described above, the embodiment shown in FIG. 16 can effect control of tone colors obtainable by the prior art musical tone synthesizing technique employing the frequency modulation system (e.g. percussion and wind instrument sounds) and tone colors which are favourably obtaineable by the present invention (e.g. string instrument tones) by suitably controlling the feedback parameter $\beta$ and the modulation parameter $\alpha$.

In the embodiment of FIG. 16 also the averaging device 23 should preferably be inserted in an appropriate place where the waveform signal produced by digital computation passes (preferably on the output side of the sinusoidal wave memory 12-1 or 12-2).

Figure 17:
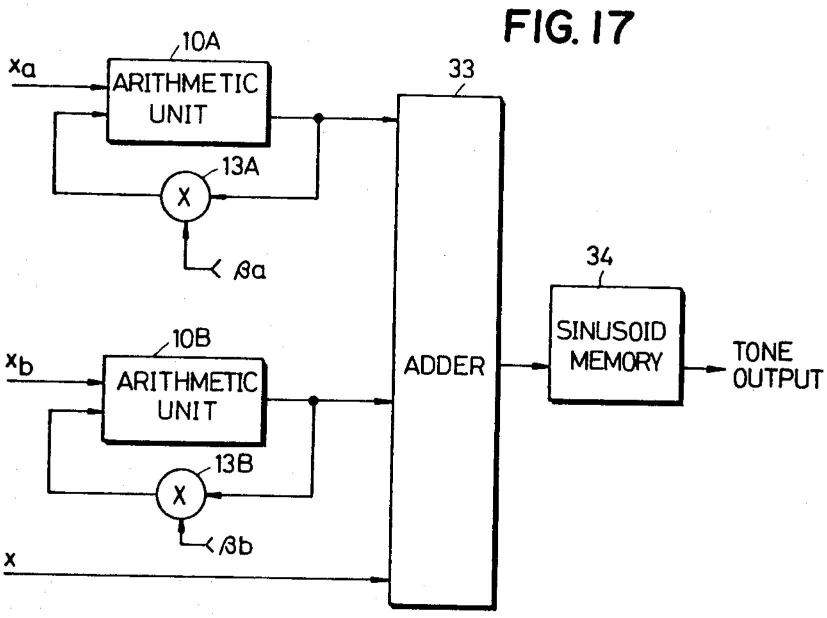
FIG. 17 is a block diagram showing an organization of still another embodiment of the invention.

FIG. 17 shows another embodiment of the invention. This embodiment comprises a pair of circuits disposed in parallel, one of the circuits including an arithmetic unit 10A and a multiplier 13A and the other circuit including an arithmetic unit 10B and a multiplier 13B. Each of these circuits is of the same organization as the arithmetic unit 10 and the multiplier 13 inserted in the feedback loop thereof. To the arithmetic unit 10A and 10B are applied phase input variables $x_a$ and $x_b$ of desired frequencies. To the multiplier 13A and 13B are applied feedback parameters $\beta$a and $\beta$b.

The output waveforms of the arithmetic unit 10A and 10B are applied to an adder 33 where they are added to a variable x of a desired frequency designated by depression of a key (an original address signal for a sinusoidal wave memory 34). The sinusoidal wave memory 34 is accessed by the output of the adder 33 to produce a tone waveform signal. Alternatively stated, the address signal x is modulated by the output waveforms of the arithmetic units 10A and 10B which operate in the same manner as the corresponding arithmetic unit of FIG. 1 and the sinusoidal wave memory 34 is accessed by this modulation address signal.

If only one arithmetic unit (10A or 10B) is used in the circuit of FIG. 17, it will be equivalent to a state where the modulation parameter $\alpha$ is set at 1 in the circuit of FIG. 16. Since the address signal x is modulated by the outputs of the two arithmetic units 10A and 10B, a very complicated tone waveform is produced by the waveform memory 34 and the harmonic components of the tone waveform are continuously controlled by varying the feedback parameters $\beta_a$ and $\beta_b$. The control of the tone waveform can therefore be easily effected. The averaging device 23 shown in FIG. 8 should preferably be inserted on the autput side of the arithmetic units 10A and 10B. The number of the arithmetic units employed is not limited to two but may be more.

Figure 19:
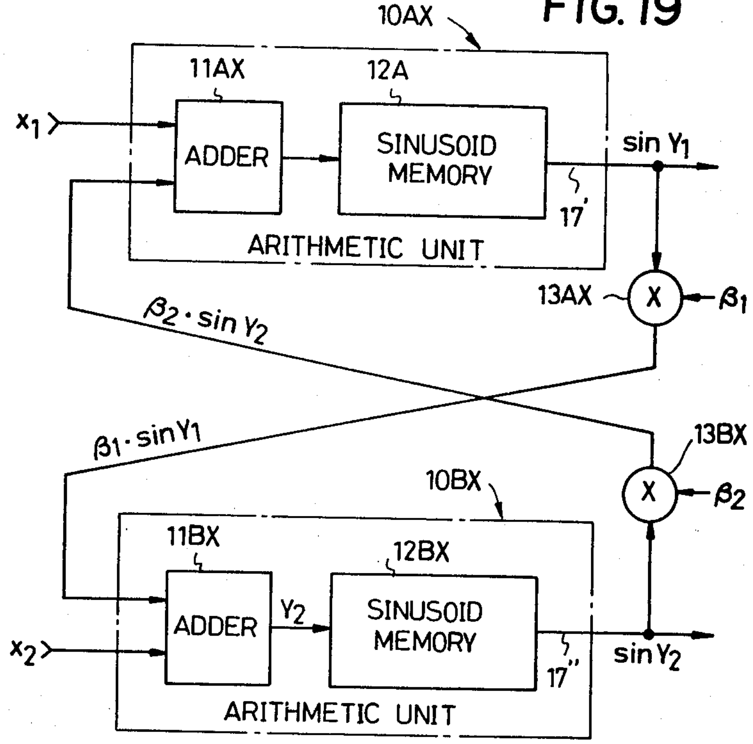
FIG. 19 is a block diagram showing an organization of further embodiment of the invention.

FIG. 19 shows another embodiment of the invention. Arithmetic units 10AX and 10BX comprise, like the arithmetic unit 10 shown in FIG. 1, adders 11AX and 11BX and sinusoidal wave memories 12AX and 12BX. Variable (address signals) $x_1$ and $x_2$ which are phase inputs repeatedly increasing (from 0 to the module) at desired repetition frequencies are applied to the arithmetic units 10AX and 10BX. Tone waveform sin $Y_1$ read from a sinusoidal wave memory 12AX of the arithmetic uit unit 10AX is multiplied with feedback parameter $\beta_1$ in a multiplier 12AX and a product $\beta_1 \cdot \sin Y_1$ is inputted to an adder 11B of the other arithmetic unit 10BX.

The adder 11BX adds the variable $x_2$ and $\beta_1 \cdot \sin Y_1$ together and its output $Y_2=x_2+\beta_1 \cdot \sin Y_1$ is used for accessing the sinusoidal wave memory 12BX. Tone waveform sin $Y_2$ read from the memory 12BX is multiplied with feedback parameter $\beta_2$ in a multiplier 13BX and a product $\beta_2 \cdot \sin Y_2$ is fed back to the adder 11AX of the arithmetic unit 10AX.

The adder 11AX adds the variable $x_1$ and $\beta_2 \cdot \sin Y_2$ together and its output $Y_1=x_1+\beta_2 \cdot \sin Y_2$, is used for accessing a sinusoidal wave memory 12AX. Tone waveforms sin $Y_1$ and sin $Y_2$ are outputted in parallel from the arithmetic units 10AX and 10BX.

As described above, the output tone waveform sin $Y_1$ of one arithmetic unit 10AX is fed back to the address input of the other arithmetic unit 10B at a rate proportional to the feedback parameter $\beta_1$ to modulate the address signal $x_2$ and, further, the output tone waveform sin $Y_2$ of the arithmetic unit 10BX is fed back to the address input of the arithmetic unit 10AX at a rate proportional to the feedback parameter $\beta_2$ to modulate the address signal $x_1$. In this manner an annular feedback loop (an indirect feedback loop) is formed between the arithmetic units 10AX and 10BX.

The variables $x_1$ and $x_2$ are produced by a circuit as shown in FIG. 10 in the same manner as was previously described.

Waveforms and spectral constructions thereof of respective parts of FIG. 19 observed in the test device are shown in FIGS. 20 through 23.

Figure 20A:
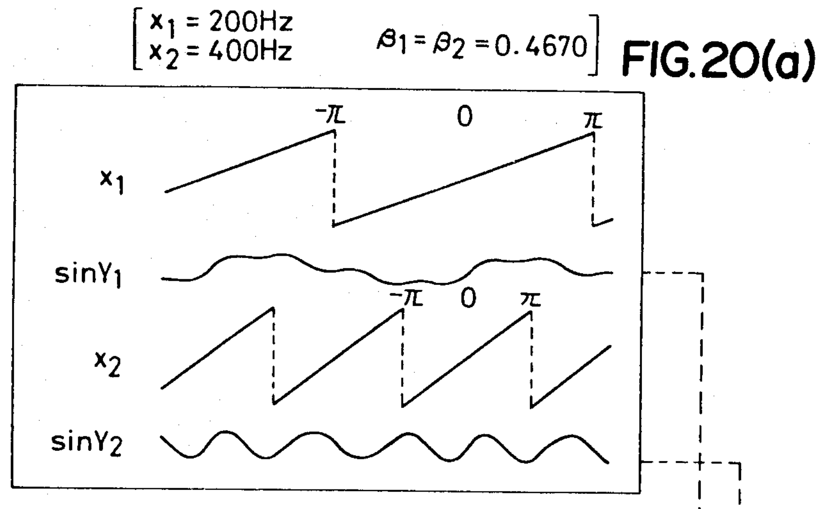
FIGS. 20 through 23 are graphical diagrams showing examples of waveforms appearing in respective parts in FIG. 19 and spectral constructions of the output tone waveforms; which waveforms and spectral constructions have been observed by the test device.
Figure 20B:
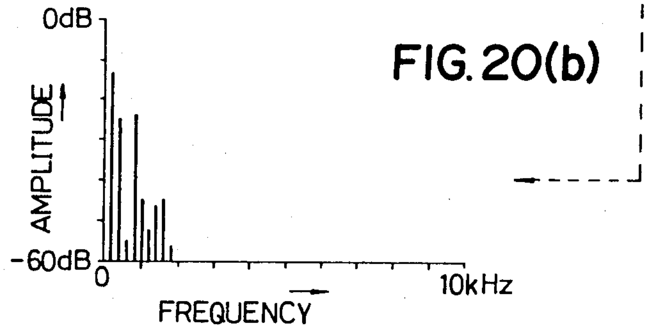
Figure 20C:
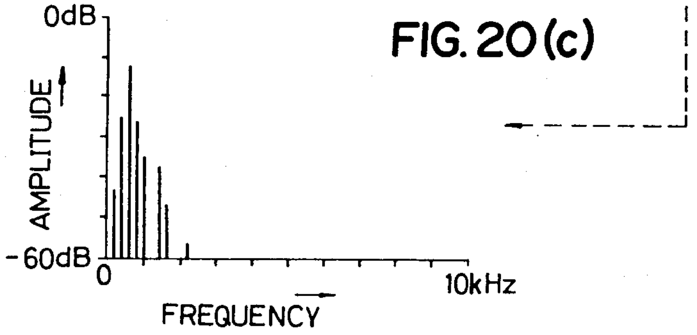
Figures 21A, 21B, 21C:
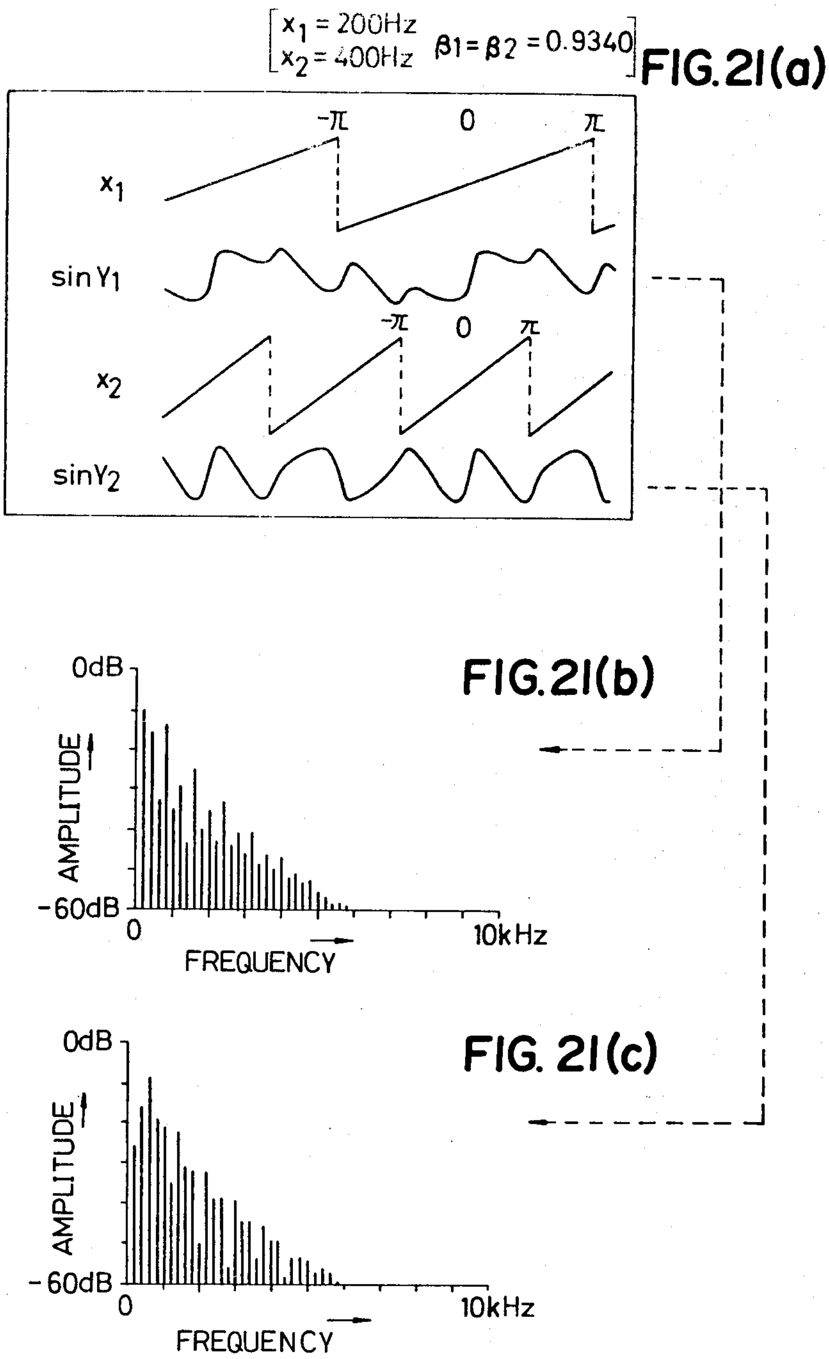
Figure 22A:
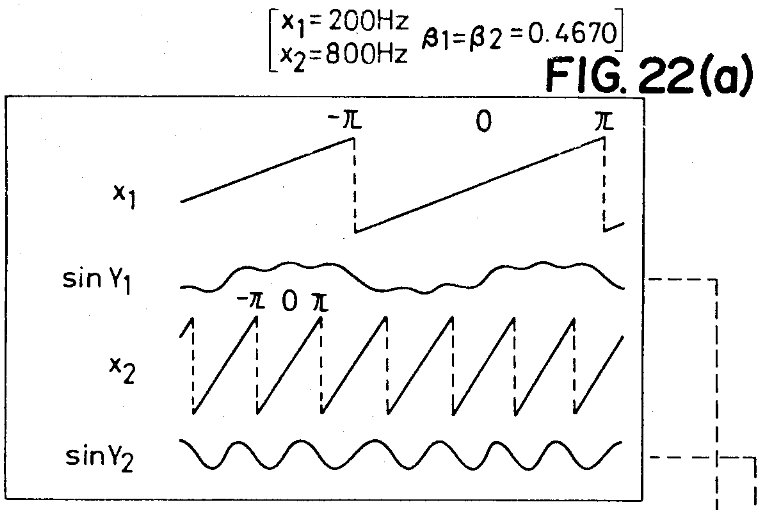
Figure 22B:
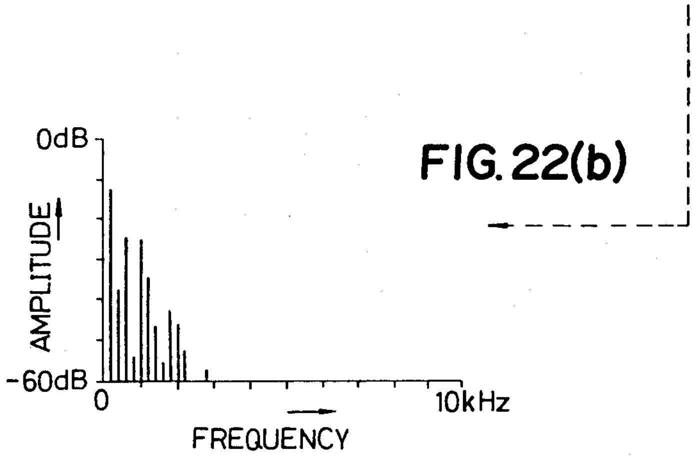
Figure 22C:
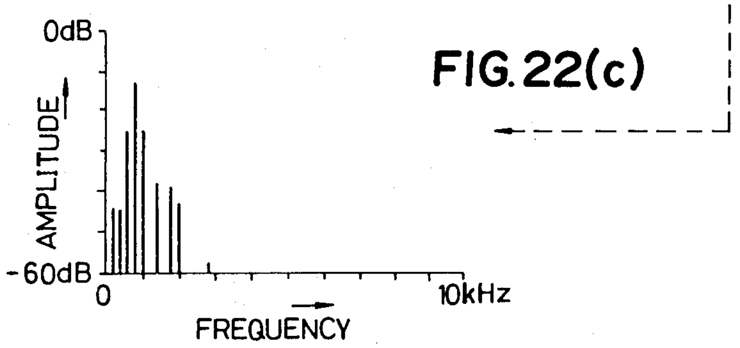
Figure 23A:
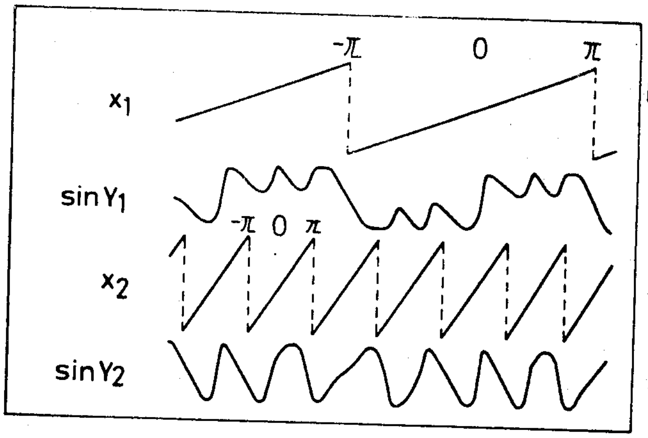
Figure 23B:
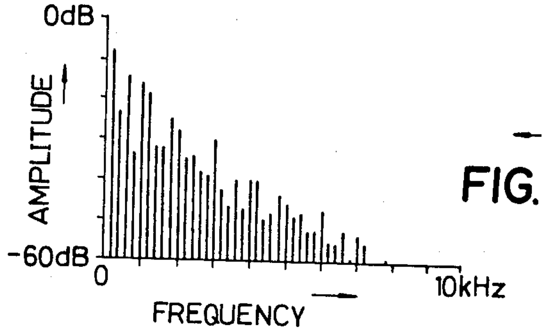
Figure 23C:
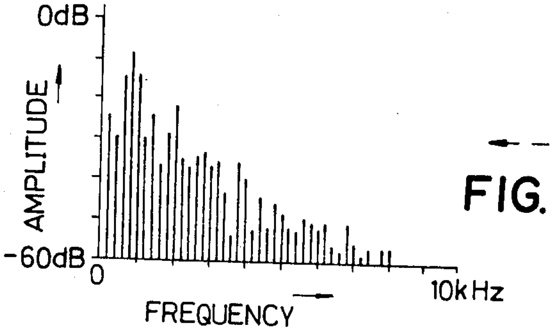

The variables $x_1$ and $x_2$ and the output tone waveforms sin $Y_1$ and sin $Y_2$ are shown in FIGS. 20(*a*), 21(*a*), 22(*a*) and 23(*a*), the spectral construction of sin $Y_1$ in FIGS. 20(*b*), 21(*b*), 22(*b*), and 23(*b*), and the spectral construction of sin $Y_2$ in FIGS. 20(*c*), 21(*c*), 22(*c*), and 23(*c*), respectively. In FIGS. 20 through 23, the relation between the feedback parameters $\beta_1$ and $\beta_2$ is set to be $\beta_1=\beta_2$. In FIGS. 20 and 22, $\beta_1$ and $\beta_2$ are set at 0.4670 and in FIGS. 21 and 23, $\beta_1$ and $\beta_2$ are set at 0.9342. In FIGS. 20 and 21, the repetition frequency of the variable $x_1$ is set at 200 Hz and that of the variable $x_2$ at 400 Hz, the ratio between the frequencies of $x_1$ and $x_2$ being 1:2. In FIGS. 22 and 23, the repetition frequency of the variable $x_1$ is set at 200 Hz and that of the variable $x_2$ at 800 Hz, the ratio between the frequencies of $x_1$ and $x_2$ being 1:4.

It will be seen from FIGS. 20 through 23 that the fundamental frequency in both the tone waveforms sin $Y_1$ and sin $Y_2$ corresponds to the variable $x_1$ of the lower repetition frequency but a peak level of the spectra of sin $Y_1$ which is the output of the arithmetic unit 10AX using this variable $x_1$ as its original address signal is located on the fundamental wave shile a peak level of the spectra of sin $Y_2$ which is the output of the arithmetic unit 10BX using the variable $x_2$ as its original address signal is located on the third or fourth harmonic. It is also observed that increase in the value of the feedback parameters $\beta_1$ and $\beta_2$ ($\beta_1=\beta_2$) results in increase in the number of harmonoics.

It is also observed from the spectral construction shown in FIGS. 20 through 23 that the amplitude generally becomes smaller as the number of order increases. Further, as the value of the feedback parameters $\beta_1$ and $\beta_2$ ($\beta_1=\beta_2$) are decreased, harmonic components gradually disappear from those of higher orders without changing the tendency that the amplitude decreases in monotone decreasing as the number of order increases so that the spectral construction converges smoothly to the side of a lower order.

From the above described observed data, it has been confirmed that in the present embodiment also the spectral construction of a produced musical tone can be smoothly and continuously controlled by varying the values of the feedback parameters $\beta_1$ and $\beta_2$. It has also been confirmed by experiments conducted on the test device that the above described effect is remarkable when the range of variation of $\beta_1$ and $\beta_2$ is set between 0 and about 1.5. Even with $\beta_1$ and $\beta_2$ of a greater value than about 1.5, interesting waveform can be produced. If the feedback parameters $\beta_1$ and $\beta_2$ are made functions of time $\beta_1(t)$ and $\beta_2(t)$, the spectral construction of the tone waveform is smoothly and continuously controlled as time elapses. In this embodiment also the averaging device 23 as shown in FIG. 8 should preferably be inserted on the output side of the arithmetic units 10A and 10B. The waveforms shown in FIGS. 20 through 23 have been obtained by inserting the averaging device 23 in line 17' and 17".

In the embodiment shown in FIG. 19, two arithmetic units 10A and 10B are employed but more arithmetic units may of course be employed.

Figure 24:
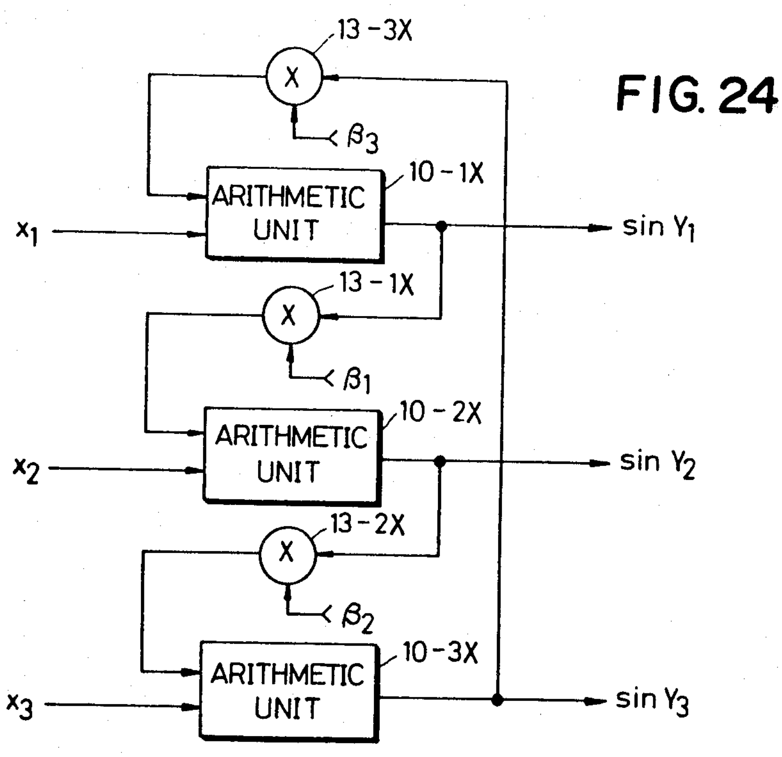
FIG. 24 is a block diagram showing an organization of still another embodiment of the invention.

FIG. 24 shows an example in which three arithmetic units 10-1X, 10-2X and 10-3X are provided. Each of these arithmetic units comprises an adder and a sinusoidal wave memry accessed by the output of this adder, and also an averaging device 23 as shown in FIG. 8.

Variables $x_1$, $x_2$ and x are supplied as a phase input (address signal) to inputs of the respective arithmetic units 10-1X, 10-2X and 10-3X. Tone waveform sin $Y_1$ outputted by the first arithmetic unit 10-1X is fed back to the input side of the second arithmetic unit 10-2X via a multiplier 13-1X. Then tone waveform sin $Y_1$ is multiplied with the feedback parameter $\beta_1$ in the multiplier 13-1X so that the address signal $x_2$ for the second arithmetic unit 10-2X is modulated by the multiplication product $\beta_1$·sin $Y_1$. Tone waveform sin $Y_2$ is outputted by the arithmetic unit 10-2X in accordance with the modulated address signal $x_2$ and this waveform sin $Y_2$ is applied to the third arithmetic unit 10-3X via a multiplier 13-2X. Accordingly, the address signal $X_3$ for the third arithmetic unit 10-3X is modulated (i.e. added) by a feedback waveform $\beta_2$·sin $Y_2$ which is a product of multiplying the output signal $Y_2$ of the second arithmetic unit 10-3 by the feedback parameter $\beta_2$. The tone waveform sin $Y_3$ produced by the third arithmetic unit 10-3X in accordance with the modulated address signal is fed back to the input side of te first arithmetic unit 10-1X via a multiplier 13-2X. Accordingly, the address signal $x_1$ for the first arithmetic unit 10-1X is also modulated (i.e. added) by the feedback waveform $\beta_3$·$Y_3$ of the third arithmetic unit 10-3X.

As described above, the arithmetic units 10-1X through 10-3X constitute an annular indirect feedback loop in which the output tone waveforms of the respective arithmetic units 10-1X through 10-3X are respectively fed back to the input sides of next arithmetic units at feedback ratios determined by the respective feedback parameters $\beta_1$, $\beta_2$ and $\beta_3$ and, after such sequential feeding back, the feedback waveforms return to the input sides of the arithmetic units from which they originated. By this arrangement, waveforms corresponding to the repetition frequencies of the address signals $x_1$, $x_2$ and $x_3$ are modulated in a complex way. Accordingly, the output tone waveforms sin $Y_1$, sin $Y_2$ and sin $Y_3$ provided by the circuit of FIG. 24 assume more complex configuration than those shown in FIGS. 20 through 24.

The repetition frequencies of the phase input variables $x_1$, $x_2$ and $x_3$ of the respective systems may be the same as one another. These variables may also be in a relation of non-integer multiple with respect to one another, in which case an unpitched sound is produced. If the repetition frequencies of the variables $x_1$, $x_2$ and $x_3$ are made slightly different from one another, beat is produced with a result that a chorus effect is produced. It is also possible to make a relation between a selected pair (e.g. $x_1$ and $x_2$) of the three systems an integer multiple relation and a retation between another selected pair (e.g. $x_1$ and $x_3$) a non-integer multiple relation.

Figure 18:
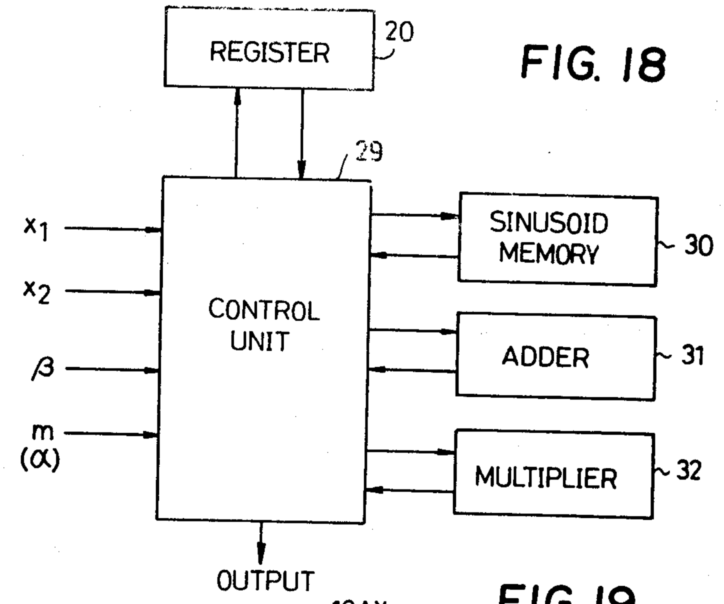
FIG. 18 is a block diagram showing an organization of yet another embodiment of the invention in which a single arithmetic unit is used for various functions by a programmed control.

The circuits shown in FIGS. 9, 16, 17, 19 and 24 comprise the arithmetic units 10-1, 10-2; 10A, 10B; 10AX, 10BX and 10-1X through 10-3X and the multipliers 13-1; 13A, 13B; 13AX, 13BX, 13-1X through 13-3X and 27, 28. These units and multipli-rs need not necessarily be provided in plurality. As shown in FIG. 18, a single sinusoidal wave memory 30, adder 31, multiplier 32 and register 20 may be provided and therse may be commonly used on a time shared basis by control of a control unit 29. In this case, the control unit 29 implements computation as shown in FIG. 9, 16, 17, 19 or 24.

The present invention is applicable not only to production of a single tone but also to simultaneous production of plural tones in a polyphonic type electronic musical instrument. If used in the polyphonic type instrument, the key logic 14 shown in FIG. 3 is constituted by a known tone production assignment circuit named a key assigner or a channel processor in which tones assigned to respective channels are produced on a time shared basis.

The feedback parameter $\beta$ and the modulation parameters m and may be functions of time B(+), m(t) and $\alpha(t)$. In this case, envelope generatres (not shown) may be provided in correspondence to these parameters $\beta(t)$, m(t) and $\alpha(t)$ and these envelope generators may be driven in accordance wit a key-on signal KON supplied by the key logic 14 to generates the parameters $\beta(t)$, m(t) and $\alpha(t)$ in the form of envelope shapes corresponding to actuation of keys (i.e. tone production interval).

In the present invention, the term "waveform memory" (i.e. sinusoidal wave memory 12) includes a device which generates a waveform by computation, i.e. a device which implements computation of waveform amplitudes usign an input corresponding to an address signal as a phase parameter.

In the above described embodiment, the feedback parameter $\beta$ is selected within a range of 0 to about 1.5. If a greater value of $\beta$ is selected, a tone effect differnet from those obtaineable from the prior art instrument can still be produced. Further, if a waveform other than a trigonometric function wave is sorted in the sinusoidal wave memory 12, a tone effect different from those of the prior art instrument can still be obtained.

What is claimed is:

1. A method for producing a tone by reading a waveform memory storing a predetermined waveform by an address signal of a selected repetition frequency comprising:

a step of multiplying the output of said waveform memory with a parameter;

a step of adding the multiplication product to said address signal; and a step of reading said same waveform memory by means of the output resulting from said addition, a tone being produced by using the output of said same waveform memory.

2. A method for producing a tone by reading a waveform memory storing a predetermined waveform by an address signal of a selected repetition frequency comprising:

a step of multiplying the output of said waveform memory with a first parameter;

a step of adding the multiplication product to said address signal;

a step of reading said waveform memory by means of the output resulting from said addition;

a step of further multiplying said multiplication product with a second parameter to produce a second multiplication product;

a step of adding said second multiplication product to another address signal;

a step of reading a second waveform memory by means of the address signal added with said second multiplication product, a tone being produced by using the output of said second waveform memory.

3. A method for producing a tone by reading a waveform memory storing a predetermined waveform by an address signal of a selected repetition frequency comprising:

a step of multiplying the output of said waveform with a first parameter;

a step of adding the multiplication product to said address signal;

a step of reading said waveform memory by means of the output resulting from said addition;

a step of multiplying the output of said waveform memory with a second parameter aside from said multiplication with the first parameter to produce a second multiplication product;

a step of adding said second multiplication product to another address signal;

a step of reading a second waveform memory by means of the address signal added with said second multiplication product, a tone being produced by the output of said second waveform memory.

4. A method for producing a tone comprising:

a step of multiplying outputs of a plurality of waveform memories with predetermined parameters;

a step of adding the multiplication product to address signals for corresponding ones of said waveform memories for reading said waveform memories;

a step of adding the outputs of said waveform memories to another address signal; and a step of reading another waveform memory different from said waveform memories by said other address signal added with the outputs of said waveform memories, a tone being produced by the output of said other waveform memory.

5. A method for producing a tone by reading a waveform memory storing a predetermined waveform by an address signal of a selected repetition frequency comprising:

a step of multiplying the output of said waveform memory with a parameter;

a step of adding the multiplication product to said address signal;

a step of reading said waveform meory by means of the output resulting from said addition; and a step of sequentially calculating a mean value of amplitudes at two sample points adjacent to each other of a tone waveform read from said waveform memory.

6. A method for producing a tone by reading each of waveform memroies provided in plural systems storing a predetermined waveforms by an address signal of a selected repetition frequency comprising:

a step of multiplying the output of said waveform memory of each system with a parameter; and a step of supplying the multiplication product in each system to the address input side of a next system while supplying the multiplication product in the last system to the address input side of the first system thereby to modulate the address signal in each system by the multiplication product supplied to each system.

* * * * *